(12) United States Patent
Rutt et al.

(10) Patent No.: US 9,171,277 B2
(45) Date of Patent: Oct. 27, 2015

(54) GENERATION OF PLANS FOR LOADING AND UNLOADING A CONTAINER

(75) Inventors: John D. Rutt, Allentown, PA (US);
Frank J. Cygler, III, Nazareth, PA (US);
Richard A. Bucher, Jamison, PA (US)

(73) Assignee: Victaulic Company, Easton, PA (US)

( * ) Notice: Subject to any disclaimer, the term of this patent is extended or adjusted under 35 U.S.C. 154(b) by 582 days.

(21) Appl. No.: 13/101,082

(22) Filed: May 4, 2011

(65) Prior Publication Data
US 2012/0283868 A1  Nov. 8, 2012

(51) Int. Cl.
*G06F 7/00* (2006.01)
*G06Q 10/08* (2012.01)
*G06Q 10/04* (2012.01)

(52) U.S. Cl.
CPC ............ *G06Q 10/083* (2013.01); *G06Q 10/043* (2013.01)

(58) Field of Classification Search
USPC .................... 700/217, 213; 701/124; 705/8
See application file for complete search history.

(56) References Cited

U.S. PATENT DOCUMENTS

| 2,809,664 | A | 10/1957 | Vollmar, Jr. |
| 3,195,723 | A | 7/1965 | MacDonnell et al. |
| 3,596,781 | A | 8/1971 | Burton |
| 4,250,687 | A | 2/1981 | Lueneberg et al. |
| 4,565,289 | A | 1/1986 | Lesueur |
| 4,643,307 | A | 2/1987 | Wilkinson |
| 4,772,063 | A | 9/1988 | Amy |
| 5,138,822 | A | 8/1992 | Velge |
| 5,566,530 | A | 10/1996 | Johnstone et al. |
| 5,924,569 | A | 7/1999 | Kleinschmit, Jr. et al. |
| 6,164,883 | A | 12/2000 | Wilcox |
| 6,721,762 | B1 * | 4/2004 | Levine et al. .......... 1/1 |
| 7,072,763 | B2 | 7/2006 | Saxon et al. |
| 7,080,864 | B2 | 7/2006 | Casteran |
| 7,840,429 | B2 | 11/2010 | Benda et al. |

(Continued)

FOREIGN PATENT DOCUMENTS

| EP | 2083381 | 7/2009 |
| TW | I299708 B | 8/2008 |

OTHER PUBLICATIONS (Copenheaver, Blaine R.) PCT International Search Report and Written Opinion issued by the International Searching Authority regarding International Application No. PCT/US2012/032965, Jun. 27, 2012. (pp. 1-36).

(Continued)

*Primary Examiner* — Kyle Logan
(74) *Attorney, Agent, or Firm* — Ballard Spahr LLP

(57) ABSTRACT

Generation of a plan for loading or unloading a variety of objects into a container. Such objects can comprise irregularly-shaped objects, regularly-shaped object, or a combination thereof. In one embodiment, a method enables such generation, wherein the method can comprise the steps of storing a model for each object of a plurality of objects, each model comprising a weight, a center of gravity, and a shape of the associated object, and storing a plurality of parameters associated with the container. The method can comprise the steps of selecting a set of one or more objects, from the plurality of objects, to be loaded into the container, and generating an optimized sequence for loading the set of one or more objects into the container, based on at least the weight, the center of gravity, the shape of each of the one or more objects, and the parameters associated with the container.

24 Claims, 19 Drawing Sheets

(56) References Cited

U.S. PATENT DOCUMENTS

| | | | |
|---|---|---|---|
| 7,991,634 | B2 | 8/2011 | Cartwright et al. |
| 8,554,371 | B2* | 10/2013 | Parker .......................... 700/259 |
| 2002/0023412 | A1 | 2/2002 | Usui et al. |
| 2002/0120356 | A1* | 8/2002 | Takahashi et al. ............. 700/98 |
| 2004/0020168 | A1 | 2/2004 | Simonsen et al. |
| 2004/0079557 | A1* | 4/2004 | Saxon et al. .................. 177/136 |
| 2004/0179928 | A1 | 9/2004 | Bartlett |
| 2005/0197876 | A1* | 9/2005 | Benda et al. ....................... 705/7 |
| 2006/0235769 | A1 | 10/2006 | Cheng et al. |
| 2009/0326718 | A1* | 12/2009 | Bryfors et al. ................ 700/275 |
| 2010/0107551 | A1* | 5/2010 | Berry et al. .................. 52/745.2 |
| 2011/0048990 | A1* | 3/2011 | Goda ........................... 206/386 |
| 2011/0078182 | A1* | 3/2011 | Fenyes et al. ................ 707/770 |

OTHER PUBLICATIONS

1D Stock Cutter (1DSC). Product Page [online]. Astrokettle Algorithms, 2010, pp. 1-5 [retrieved on Jul. 22, 2010]. Retrieved from the Internet: <URL: www.astrokettle.com/pr1dsc.html>.

Advanced Loading System (ALS). Product Page [online]. Advanced Logistics Systems, Inc., 2010, pp. 1-2 [retrieved on Jul. 26, 2010]. Retrieved from the Internet: <URL: www.advanced-logistics.com/3%201%20adv%20lod%20sys.html>.

ALS Web Client Sample Loading Results. Product Page [online]. Advanced Logistics Systems, Inc., 2010, pp. 1-3 [retrieved on Jul. 26, 2010]. Retrieved from the Internet: <URL: www.advanced-logistics.com/3%201%20web%20sample%20results.html>.

ALS Web Client. Product Page [online]. Advanced Logistics Systems, Inc., 2010, pp. 1-2 [retrieved on Jul. 26, 2010]. Retrieved from the Internet: <URL: www.advanced-logistics.com/3%201%20web%20client.html>.

AutoLoad Pro-Container Loading Software 2007. Product Page [online]. Coptimal Logics Inc., 2007, pp. 1-2 [retrieved on Aug. 5, 2010]. Retrieved from the Internet: <URL: http://autoload-pro-container-loading-software.coptimal-logics-inc.qarchive.org>.

Cargo Load Plan—CubeMaster 10.3.2.0. Product Page [online]. Logen Solutions, 2009, pp. 1-3 [retrieved on Aug. 5, 2010]. Retrieved from the Internet: <URL: http://cargo-load-plan-cubemaster.logen-solutions.qarchive.org>.

Cargo Loading Software. Product Page [online]. Logen Solutions, 2010, pp. 1-2 [retrieved on Jul. 22, 2010]. Retrieved from the Internet: <URL: www.logensolutions.com/?gclid=CJziypv8_61CFcIL5QodLWIKZg>.

Cargo Optimizer 4.0. Product Page [online]. Dreamsofts Optimization Ltd., 2006, pp. 1-2 [retrieved on Aug. 5, 2010]. Retrieved from the Internet: <URL: http://cargo-optimizer.dreamsofts-optimization-ltd-part.qarchive.org>.

Cargo Securement Rules. [online]. Federal Motor Carrier Safety Administration (FMCSA), 2003, pp. 1-15 [retrieved on Oct. 18, 2011]. Retrieved from Internet: <URL: www.fmcsa.dot.gov/rules-regulations/truck/vehicle/cs-policy.htm?printer=true>.

CargoWiz Logistics Software Features. Product Page [online]. Softtruck, 2007, pp. 1-5 [retrieved on Jul. 22, 2010]. Retrieved from Internet: <URL: www.softtruck.com/feature_details.htm>.

CargoWiz Truck and Container Loading Software. Product Page [online]. Softtruck, 2007, pp. 1-2 [retrieved on Jul. 22, 2010]. Retrieved from Internet: <URL: wwwsofttruck.com>.

Corcoran III, A.L. and Wainwright, R.L., "A genetic algorithm for packing in three dimensions," Proceedings of the 1992 ACM/SIGAPP symposium on Applied computing: technological challenges of the 1990's, 1992, pp. 1021-1030.

Demaine, E.D. and Demaine, M.L., "Jigsaw Puzzles, Edge Matching, and Polyomino Packing: Connections and Complexity," Graphs and Combinatorics, 2007, vol. 23 [Suppl]: pp. 195-208.

Denson Engineers, Inc., "Pipe Storage and Movement Study," [online]. Avondalee Shipyards, Inc., 1986, pp. 1-153 [retrieved on Oct. 18, 2011]. Retrieved from the Internet: <URL: www.dtic.mil/cgi-bin/GetTRDoc?AD=ADA444039>.

Faina, L., "A global optimization algorithm for the three-dimensional packing problem," European Journal of Operational Research, 2000, 126(2): pp. 340-354.

Furuholmen, M. et al., "An Indirect Approach to the Three-Dimensional Multi-pipe Routing Problem," In Proceedings of EuroGP 2010, A. I. Esparcia-Alcazar et al. (Eds.), 2010, LNCS 6021, 86-97.

Kimoto, K. et al., "A solution of three-dimensional polyomino packing problems," 2007 IEEE International Conference on Systems Man and Cybernetics, 2007, pp. 3725-3730.

Lim, A. et al., "3-D Container Packing Heuristics," Applied Intelligence, 2005, 22(2): pp. 125-134.

Scientific Software Areas. Product Page [online]. Astrokettle Algorithms, 2010, pp. 1-5 [retrieved on Jul. 22, 2010]. Retrieved from the Internet: <URL: www.astrokettle.com>.

Software Products for Engineering Optimization. Product Page [online]. Astrokettle Algorithms, 2010, pp. 1-2 [retrieved on Jul. 22, 2010]. Retrieved from the Internet: <URL: www.astrokettle.com/prod.html>.

Author Unknown; Search Report from corresponding Taiwan patent application No. 101116067; p. 1; Jun. 26, 2014.

* cited by examiner

TRAILER BILL OF MATERIAL

TRAILER NUMBER: 01

| LEVEL | TAG | QTY | SIZE | DESCRIPTION | TOTAL WEIGHT (lbs) | FAB SEQUENCE |
|---|---|---|---|---|---|---|
| LEVEL1 | 1 | 1 | 24" | SPOOL: CHWR-01 | 2217.4 lbs | 1 |
| LEVEL1 | 2 | 1 | 24" | SPOOL: CHWR-03 | 3260.2 lbs | 2 |
| LEVEL1 | 3 | 1 | 24" | SPOOL: CHWS-01 | 2101.2 lbs | 3 |
| LEVEL1 | 4 | 2 | | EQP: CH-123 | 14558.34 lbs | 4 |
| LEVEL1 | 5 | 3 | | EQP: HX-123 | 4234 lbs | 5 |
| LEVEL1 | 6 | 2 | | EQP: P-123 | 2400 lbs | 6 |
| LEVEL1CRIBBING | 7 | 1 | 4"x4"x6" | CRIBBING | 32.16 lbs | |
| LEVEL1CRIBBING | 8 | 1 | 4"x4"x4" | CRIBBING | 21.44 lbs | |
| LEVEL2 | 9 | 1 | 24" | SPOOL: CHWS-07 | 3323.7 lbs | 7 |
| LEVEL2 | 10 | 1 | 24" | SPOOL: CHWS-06 | 2378.6 lbs | 8 |
| LEVEL2CRIBBING | 11 | 4 | 4"x4"x8" | CRIBBING | 50.28 lbs | |
| LEVEL2CRIBBING | 12 | 1 | 4"x4"x6" | CRIBBING | 32.16 lbs | |
| LEVEL2CRIBBING | 13 | 7 | 4"x24"dia | CHOCK | 37.52 lbs | |
| | | | | | 34647 lbs | |

GENERATION OF PLANS FOR LOADING AND UNLOADING A CONTAINER

SUMMARY

In accordance with the purposes of the subject disclosure, as embodied and described herein, the subject disclosure, according to various aspects, relates to packing planning and, more particularly, yet not exclusively, to generation of plans for loading and unloading a container. Such container is a physical space bounded by a surface, which is defined by an envelope that is logical, physical, or a combination thereof. In certain embodiments, a container serves as a vehicle for transportation of a plurality of objects with irregular geometries. In other embodiments, the container serves as a static repository for the plurality of objects. In one aspect, the plurality of objects includes at least one irregularly-shaped object, at least one regularly-shaped object, or a combination of such objects. A plan for loading or unloading the container can determine a sequence for loading or unloading the container. The plan can be determined manually, semi-automatically, or automatically based at least on a rule or a preference, or both. Sequences for loading a container or sequences for unloading the container are referred to as optimized sequences. In one aspect, an optimized sequence can be an optimal sequence that maximizes a packing efficiency metric $\Pi$ which can be a function of one or more factors (e.g., variables). In another aspect, the optimized sequence can be non-optimal in that it does not maximize the efficiency metric $\Pi$. A non-optimal sequence can be an optimized sequence for a specific set of constraints, e.g., values of the various factors that define $\Pi$.

In one aspect, the subject disclosure provides a method for generating a plan for loading irregularly-shaped objects into a container. Such method comprises the steps of storing a model for each of a plurality of irregularly-shaped objects, each model comprising a weight, a center of gravity and a shape of the associated irregularly-shaped object; storing a plurality of parameters associated with the container; selecting a set of irregularly-shaped objects, from the plurality of irregularly-shaped objects, to be loaded into the container; and generating an optimized sequence for loading the set of irregularly-shaped objects into the container, based on at least the weight, the center of gravity, the shape of each of the irregularly-shaped objects in the set, and the parameters associated with the container. In another aspect, embodiments of the subject disclosure also can provide methods for unloading a container.

In another aspect, the subject disclosure provides a system for generating a plan for loading irregularly-shaped objects into a container. The system comprises a database for storing: a model for each of a plurality of irregularly-shaped objects, each model comprising a weight, a center of gravity, and a shape of the associated irregularly-shaped object; and a plurality of parameters associated with the container. The system also comprises a processor for performing the steps of: selecting a set of irregularly-shaped objects from the plurality of irregularly-shaped objects, to be loaded into the container; and generating an optimized sequence for loading the set of irregularly-shaped objects into the container, based on at least the weight, the center of gravity, the shape of each of the irregularly-shaped objects in the set and the parameters associated with the container. In certain embodiments, the processor of the system can perform the step of displaying a map depicting the optimized sequence for loading the set of irregularly-shaped objects into the container. Other embodiments enable rendering other types of information, such as a fabrication sequence, cribbing details for manufacturing thereof based on load layout on a container, or the like. In addition, in certain scenarios, the system can generate a plan for loading a combination of irregularly-shaped objects and regularly-shaped objects.

In yet another aspect, the subject disclosure provides a computer-readable medium adapted for use in generating a plan for loading irregularly-shaped objects into a container, the computer-readable medium used to direct a computer to perform steps comprising: storing a model for each of a plurality of irregularly-shaped objects, each model comprising a weight, a center of gravity and a shape of the associated irregularly-shaped object; storing a plurality of parameters associated with the container; selecting a set of irregularly-shaped objects, from the plurality of irregularly-shaped objects, to be loaded into the container; and generating an optimized sequence for loading the set of irregularly-shaped objects into the container, based on at least the weight, the center of gravity, the shape of each of the irregularly-shaped objects in the set and the parameters associated with the container.

One of various advantages of certain embodiments of the subject disclosure is the integration of manufacturing and shipping—e.g., development of manufacturing plans of objects to be transported can be based at least on details of shipping or delivery of the irregularly-shaped objects. Another of the various advantages is reduction of various planning stages or cycles for transportation logistics; certain embodiments provide a virtual loading environment that can be automated or semi-automated and thus can allow assessment of various loading scenarios within short simulation times (e.g., of the order of seconds or minutes) rather than incurring time and human resource costs. Yet another advantage, in exemplary storage scenarios, is that accessibility to or desirability of an object (regularly-shaped, irregularly shaped, or both) can be readily included in analysis implemented (e.g., performed through execution of computer executable instructions) by packing platform 110 or component(s) thereof, such processor(s) 244. Additional advantages will be set forth in part in the description which follows, and in part will be apparent from the description, or may be learned by practice of the subject disclosure. It is to be understood that both the foregoing general description and the following detailed description are exemplary and explanatory only and are not restrictive of the subject disclosure, as claimed.

BRIEF DESCRIPTION OF THE DRAWINGS

The annexed drawings, which are incorporated in and constitute a part of this specification, illustrate several aspects of the subject disclosure and together with the description, serve to explain the principles of the subject disclosure.

FIG. 7D illustrates a bill of materials (BOM) for a trailer presented in the report of FIG. 7A.

DETAILED DESCRIPTION

Figure 1:
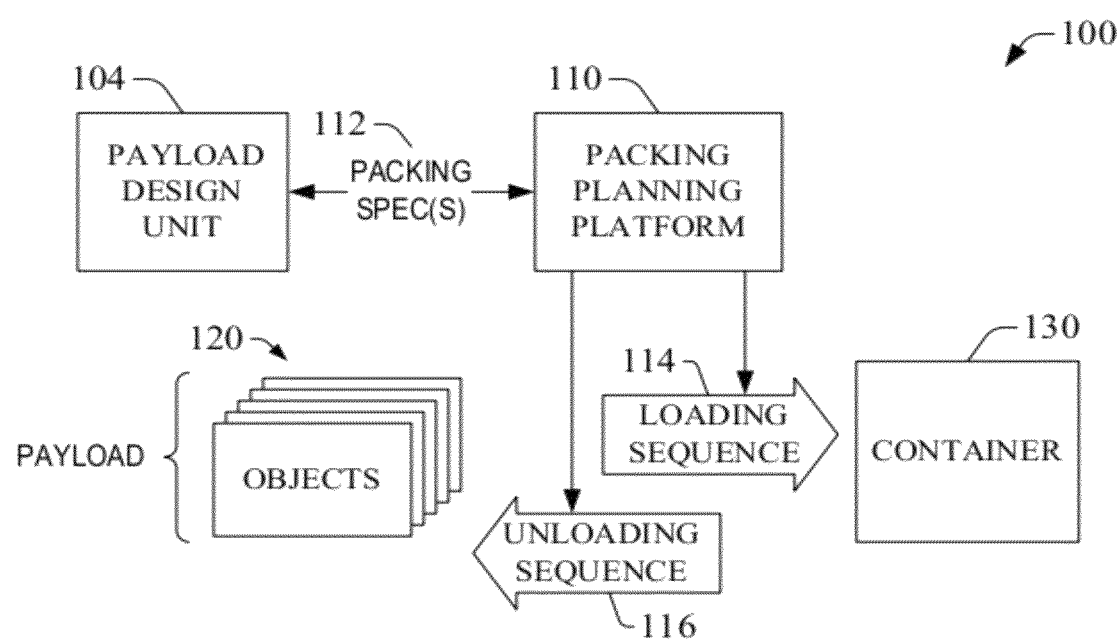
FIG. 1 illustrates an exemplary system that enables operation in accordance with aspects of the subject disclosure.

The subject disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "fabrication spool" can include two or more such spools unless the context indicates otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event, circumstance, or feature, may or may not occur, and that the description includes instances where the described event, circumstance, or feature occurs and instances where it does not.

As employed in this specification and annexed drawings, the terms "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

In the subject disclosure, the term "container" refers to a physical space bounded by a surface, wherein the surface is defined by a one or more parameters that define an envelope that is logical, physical, or a combination thereof. In one aspect, a physical envelope generally comprises one or more materials, either rigid, semi-rigid, flexible or soft, or combination of such various types of materials; the one or more materials arranged to form the surface that bounds the physical space. In one aspect, the physical space associated with the container and the functional purpose of the container can specify certain features (structural or otherwise) of the container. In another aspect, a logical envelope does not include a material, but rather it comprises a group of parameters (e.g., real numbers) that defines a formal, immaterial boundary. In certain embodiments, a container is a sea container bounded by at least six facets (e.g., six steel sheets) forming a void parallelepiped object. In other embodiments, the container is a trailer comprising at least one solid surface and a logical envelope that in combination with the at least one surface bound a space suitable for packing objects. In additional or alternative embodiments, the container can be a storage yard, a fabrication site, a shop floor. More generally, a container can be embody a storage space, staging space, a transportation space, a manufacturing space, and the like.

Reference will now be made in detail to the various aspects, examples of which are illustrated in the accompanying drawings. Wherever possible, the same reference numbers are used throughout the drawings to refer to the same or like parts.

Various aspects described herein can be embodied as a method, a system, or a computer program product. Accordingly, aspects of the present invention can take the form of an entirely hardware aspect, an entirely software aspect, or an aspect combining software and hardware aspects. Furthermore, aspects of the present invention can take the form of a computer program product on a computer-readable storage medium having computer-readable program instructions (e.g., computer software) embodied in the storage medium. More particularly, aspects of the present invention can take the form of web-implemented computer software. Any suitable computer-readable storage medium can be utilized including hard disks, CD-ROMs, optical storage devices, or magnetic storage devices.

Aspects are described below with reference to block diagrams and flowchart illustrations of methods, systems, apparatuses and computer program products according to an aspect of the invention. It will be understood that some blocks of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring to the drawings, FIG. 1 illustrates a high-level block diagram of an exemplary system 100 that enables operation in accordance with aspects of the subject disclosure. Such exemplary system 100 can be exploited for packing irregularly-shaped objects, regularly-shaped objects, or combinations, in accordance with aspects described herein. Example system 100 includes a packing planning platform 110 that can receive packing specification(s) 112, can establish, at least in part, one or more of a payload (e.g., a group of fabrication spools) to be loaded or unloaded from a container 130. In embodiments in which the payload is to be stored within the container 130, the container 130 can be embodied in a storage area, such as a storage container or a storage yard, a manufacturing area, or a garage. In embodiments in which payload is to be transported employing the container 130, the container 130 can be embodied in a vehicle to be utilized to transport the payload and characteristics of such vehicle, various features of loading transportation such as height, volumetric capacity, and weight constraints that may be imposed on the payload and/or the vehicle, features or constraints of sites for delivery of the payload, such as construction sites, storage sites, and the like. In one aspect, the payload comprises prefabricated objects (spools, cribbing, etc.) In the illustrated embodiment, payload design unit 104 can permit generation of different types of payload, e.g., piping systems, engine parts, turbine parts, etc. While illustrated as external to packing planning platform 110, at least a portion of payload design unit 104 can be integrated into packing planning platform 110. Based at least on packing specification(s) 112, packing planning platform 110 can determine (e.g., calculate) a suitable assembly of the payload (e.g., group of fabrication spools) on the container 130. For example, in a transportation scenario, packing planning 110 can generate a loading sequence or an unloading sequence, or both, for a vehicle or, more generally, a container employed for transportation of the payload. For another example, in a storage scenario, packing planning platform 110 can establish a suitable arrangement to retain in the container 130 or to release from the container 130 a plurality of objects (irregularly-shaped objects, regularly-shaped objects, both). In an aspect, packing planning platform 110, or a component therein or functionally coupled thereto, can determine the suitable assembly based on at least a center of gravity of such container and the payload, and geometric continuity. As employed in the subject disclosure, geometric continuity refers to the rigid body or semi-rigid nature of object(s) in the payload.

Packing planning platform 110 can determine the suitable assembly for a plurality of objects 120 by implementing a method of placing a plurality of objects that compose the payload in accordance with aspects of the subject disclosure. In an aspect, packing platform 110 can assess suitability of the assembly with respect to a set of one or more packing efficiency criteria, such as maximum available empty space in the container; weight capacity of the container; volumetric capacity of the container; desired unloading sequence; fabrication sequence; transportation code, storage code, or other regulatory statutes; and so forth. A suitable assembly is that which complies with at least one predetermined packing efficiency criterion. In certain embodiments, the suitable assembly can be optimal (e.g., the best assembly provide one or more packing efficiency criteria). As illustrated, in an aspect, packing planning platform 110 can generate a loading sequence 114 as part of generation of the suitable assembly. The loading sequence 114 enables a particular, yet not exclusive, order for loading the plurality of objects 120 into a container 130. In another aspect, packing planning platform 110 also can generate, at least in part, an unloading sequence 116. Factors extrinsic to container 130 and the payload can determine, at least in part, the unloading sequence 116; such factors can include accessibility to delivery site (e.g., apartment complex in urban setting, mining field in unleveled terrain, construction site in a developed or semi-developed area, or the like); available parking space at or in proximity to the delivery site; etc. In scenarios in which packing is directed storage of objects (regularly-shaped, irregularly shaped, or combinations thereof), a factor that can determine a specific loading sequence of a container (e.g., a storage container) described herein can be accessibility to certain objects. For instance, in addition to characterizing an object (e.g., irregularly-shaped object) through data indicative of structural features, packing platform 110 can receive as part of packing spec(s) 112 data indicative of durability, and thus likelihood to be accessed, of the object. In other storage scenarios, factors such as popularity (or an indicator of rank in accordance of acceptability in a community of users) also can be conveyed by packing spec(s) 112 and packing platform 110. Information related to logistics associated with a container for storage also can be included as part of packing spec(s) 112 and in the analysis implemented by packing planning platform 110.

In an embodiment, packing planning platform 110 can designate one or more lifting points for at least one object in a payload to be packed and transported. For instance, lifting point(s) for each fabrication spool piece in a plurality of fabrication spools can be determined by packing planning platform 110. Lifting points and crane operation for unloading container 130 via such lifting points also can be a factor that determines, at least in part, the unloading sequence 116.

In another embodiment, packing planning platform 110 can create an arrangement for cribbing as required for transport or suitable for transport. It should be appreciated that such arrangement is determined in part by the suitable assembly of payload that is determined by packing planning platform 110.

In addition or in the alternative to supplying a loading sequence 114 or an unloading sequence 116, packing planning platform 110 can generate a report (see, e.g., FIG. 7A, FIG. 7B, and FIG. D) comprising drawings or other type of renderings, such as a three-dimensional rendering (e.g., a 3D model, a sculpture, a hologram), of one or more depictions of a suitable assembly for a specific payload indicated via packing specification(s) 112. Such renderings can be produced for a specific stage in a loading sequence or unloading sequence, or for several stages of one or more of such sequences. Moreover or as another alternative, packing planning platform 110 can generate a bill of materials (BOM; see, e.g., FIG. 7D) that can be necessary to implement a particular, yet not exclusive, loading sequence for assembling payload into a container 130, or a particular, yet not exclusive, unloading sequence for removal of payload from the container 130.

Figure 2:
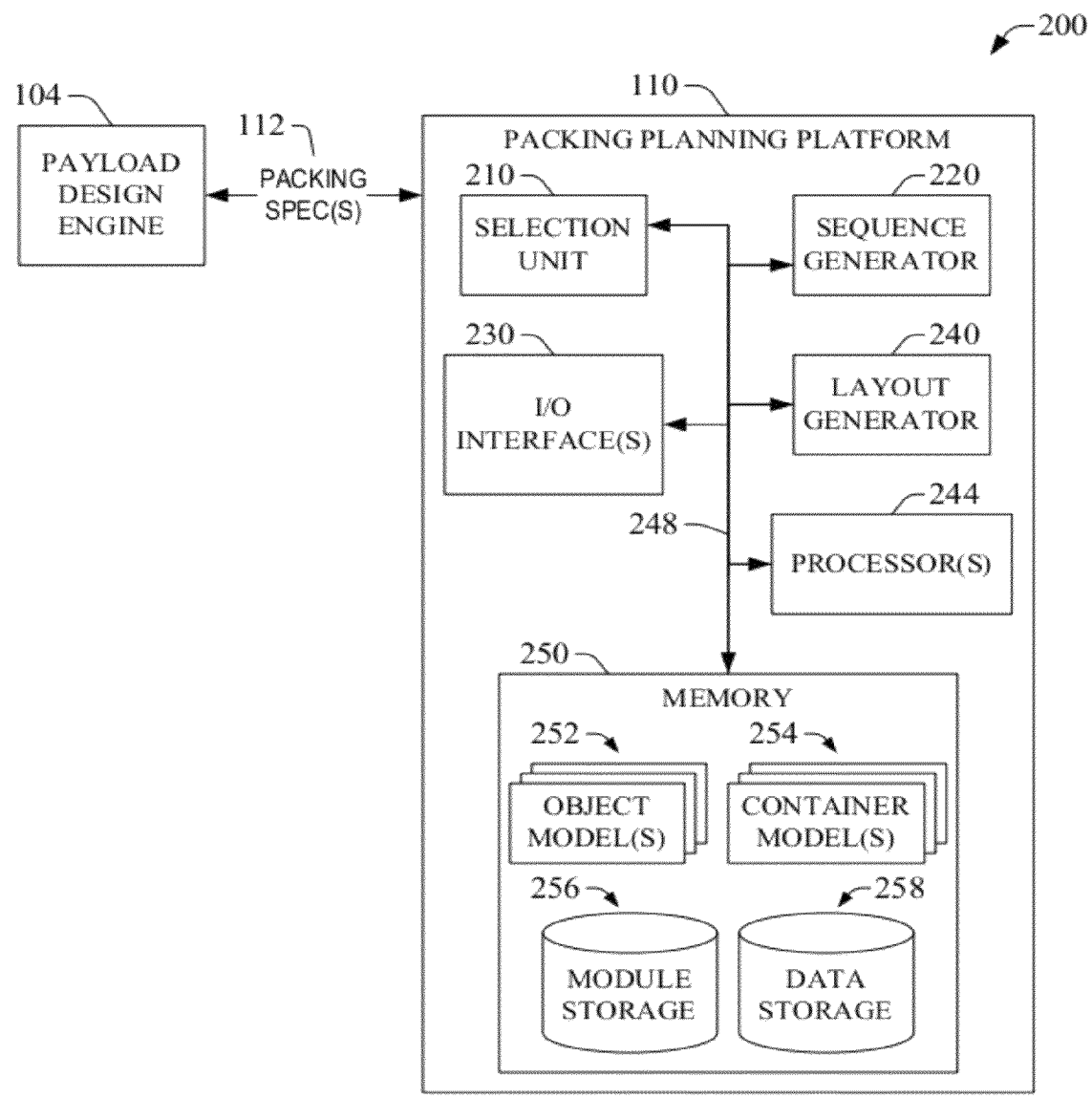
FIGS. 2-3 depict exemplary embodiments of a packing planning platform that is part of the exemplary system presented in FIG. 1.

FIG. 2 depicts a block diagram of an example embodiment 200 of a packing planning platform 110 in accordance with aspects of the subject disclosure. In such embodiment, one or more input/output interfaces (I/O interface(s)) 230 enable collection of data included in packing specification(s) 112. In certain implementations, I/O interface(s) 230 can include a display (e.g., pixel circuitry, backlight circuitry, and control circuitry) for rendering various user interfaces (UI), such as graphic user interfaces (GUIs), aural user interfaces, or combinations thereof. As illustrated, example embodiment 200 includes a selection unit 210 that can select a set of one or more irregularly-shaped objects from a plurality of irregularly-shaped objects (e.g., objects 120); the set of one or more irregularly-shaped objects is selected to be loaded into a container (e.g., container 130). As described herein, selection unit 210 can receive data representative of a design of an irregular object via packing specification(s) 112 and, to select such object, selection unit 210 can create a tag (e.g., metadata) or a record of the irregular object and link the tag or the record to such object. The tag or the record created to select the irregular-shaped object can be retained in data storage 258 (a database, a register, a file, etc.). In addition, a tag or a record of an object (irregular or regular) can be linked to a block definition that includes attribute data representative of at least one feature of the object. Such block definition can be dynamic, e.g., as a design of a selected object (e.g., fabrication spool) evolves, the block definition for such object can be updated (e.g., augmented). In one aspect, for the object (e.g., fabrication spool) attribute data in a block definition can comprise data indicative of load sequence or unload sequence, data indicative of a container (e.g., trailer) number, or data indicative of zone designation with the container. In another aspect, the block definition also can include data indicative of a loading priority or an unloading priority. In yet another aspect, the block definition can include one or more (e.g., one, two, three, four, and so forth) fields for user-defined data associated with packing or packing planning (e.g., storage planning, transportation planning) as described herein. Optionally, attribute data in a block definition of an object can include various combination of attributes described herein. For instance, a block definition can include data indicative of load sequence or unload sequence, data indicative of a container (e.g., trailer) number, data indicative of zone designation with the container, data indicative of a loading priority or an unloading priority, and one or more fields for user-defined data associated with packing or packing planning (e.g., storage planning, transportation planning). In certain scenarios, user-defined data included in a block definition described herein can be configured automatically. In one implementation, in response to generation of attribute data representative of an object, one I/O interface of the I/O interface(s) 230 can render a visual representation of attribute data that composes a block definition of an object.

Selection unit 210 can execute one or more modules, which can be embodied in a set of computer-readable computer-executable instructions and can be retained in module storage 256 in memory 250. Selection unit 210 can exchange information (data, signaling or control instructions) with memory 250 and other units of packing platform 110 via a bus 248 which can be embodied in one or more of a memory bus, a power bus, a system bus, or any other types of buses as described herein (e.g., bus 613). Execution of the one or more modules can implement the described functionality of selection unit 210. In an aspect, execution of the module by selection unit 210 can enable selection and related tagging of a system comprising a plurality of irregularly-shaped objects. For instance, the system can be a piping system and the plurality of irregularly-shaped objects can be a set of two or more fabrication spools. In certain implementations, the module can be a Pipe System Tagging module. In another aspect, execution of the module can enable selection and related tagging of at least one object of a set of one or more irregularly-shaped objects included in a system. In one embodiment, the system can be a piping system and the set of one or more irregularly-shaped objects can comprise pipe fabrication spools (or fabrication spools); pumps, such as water pumps, vacuum pumps; valves, including ball valves, gate valves, butterfly valves; flanges; beams and other support structures, engines, or the like. In other implementations, the module can be a Pipe System Tagging module or a Fabrication Spool attribute module.

Selection unit 210 can select several irregularly-shaped objects and retain a selection of such objects. For a selected irregular-shaped object, selection unit 210 can extract data from a formal representation of such object that can be produced through a payload design unit 104. A formal representation of an object can comprise data that logically defines the object in accordance with a set of rules (e.g., programming rules). Based at least on one or more of a representation of a selected irregular-shaped object or a tag or record of the such object, selection unit 210 can produce a model for each irregularly-shaped object of a plurality of irregularly-shaped objects (e.g., objects 120); in an aspect, a model of an irregularly-shaped object can comprise a weight, a center of gravity, and a shape of the associated irregularly-shaped object. Models so constructed can be retained in one or more memory elements 252, represented in FIG. 2 as object model(s) 252. In certain implementations, selection unit 210 can receive data indicative of the particular embodiment of the payload design unit 104 employed to generate a representation of an irregularly-shaped object. In one aspect, such data can be received through one I/O interface of the I/O interface(s) 230; the data can be part of packing spec(s) 112. Selection unit 210 also can receive data indicative of a method to extract data from a formal representation of the irregularly-shaped object.

Access to data indicative of aspects of generation of the representation of the irregularly-shaped object and method(s) of extraction of such data can provide selection unit 210 with a reference for the type of data and related format that can be employed in computations described herein. In one example, in a scenario in which objects (e.g., fabrication spools) are created in AutoCAD (from Autodesk, Inc. of San Rafael, Calif.), three pipe models generally are utilized to compose, or assemble, a fabrication stool: (i) 10' piece of 8" pipe; (ii) 10' piece of 8" pipe with a 107H coupling (a specific coupling from Victaulic® of Easton, Pa.) and a #10 90 degree elbow, and (iii) 10' piece of 8" pipe with (2) 107H couplings, a #10 90 degree elbow and a 2' piece of pipe. The weight for a composed fabrication spool is included in the definition of the composed fabrication spool. A method of extracting data related to a composed fabrication spool can comprise: Executing union command on all grouped components in the composed fabrication spool; moving to a common origin (0,0,0) an assembly of composed fabrication spools; and executing the massprop command to obtain the center of gravity and the total weight. It should be appreciated that for a payload design unit 104 that employs design functionality different from that available in AutoCAD, the payload design unit 104 can execute any command that, in response to execution, causes the payload design unit 104 to compute mass properties (volume, mass, density, moment of inertia, products of inertia, centroid, mass, principal moments, etc.) of a three-dimensional rigid object. Selection unit 210 can execute at least one computer-executable instruction (e.g., a script) to execute such method for each object in a plurality of objects generated with AutoCAD (as one exemplary embodiment the payload design unit 104; not shown). In another example, in a scenario in which objects (e.g., fabrication spools) are created in CAD-Mech (from Technical Sales International of Austin, Tex.), three pipe models generally are utilized to compose, or assemble, a fabrication stool: (i) 10' piece of 8" pipe, (ii) 10' piece of 8" pipe with a 107H coupling and a #10 90 degree elbow, and (iii) 10' piece of 8" pipe with (2) 107H couplings, a #10 90 degree elbow and a 2' piece of pipe. Weight and center of gravity for a composed fabrication spool is available. Selection unit 210 can execute at least one computer-executable instruction (e.g., a script) to extract data related to weight and center of gravity for each object (e.g., fabrication spool) in a plurality of objects generated with AutoCAD (as one exemplary embodiment of the payload design unit 104; not shown). In yet another example, in a scenario in which objects (e.g., fabrication spools) are created in AutoPlant, three pipe models generally are utilized to compose, or assemble, a fabrication stool: (i) 10' piece of 8" pipe, (ii) 10' piece of 8" pipe with a 107H coupling and a #10 90 degree elbow, (ii) 10' piece of 8" pipe with (2) 107H couplings, a #10 90 degree elbow, and (iii) a 2' piece of pipe. Data related to weight of a composed fabrication spool can be available. A method of extracting data related to a composed fabrication spool can comprise: Executing union command on all grouped components in the composed fabrication spool; moving to a common origin (0,0,0) an assembly of composed fabrication spools; and executing the massprop command to obtain the center of gravity and the total weight. Selection unit 210 can execute at least one computer-executable instruction (e.g., a script) to execute such method for each object in a plurality of objects generated with AutoCAD (as one exemplary embodiment of the payload design unit; not shown).

In certain embodiments, such method(s) can be retained as self-contained software application(s) or firmware application(s) (e.g., group(s) of one or more computer-executable instructions) that can be retained in memory 250. In response to a method to extract data being devised, a new self-contained software application (e.g., a plug-in application) or a firmware application can be provisioned (e.g., installed, configured, tested, and accepted) in memory 250, for example, as part of module storage 256.

Selection unit 210 can cause one I/O interface of the I/O interface(s) 230 to render (e.g., display) data indicative of a set of one or more options for the manner in which a pick list of objects (e.g., fabrication spools) is to be reported (e.g., formatted and rendered or otherwise conveyed). For a plurality of objects in the pick list, e.g., the list of objects to be loaded, selection unit 210 can extract data from at least one object (e.g., each object) of the plurality of objects in accordance with one or more methods described herein; the data can be indicative of structural features of the at least one object. In one implementation, to cause the one I/O interface to render the data indicative of the set of such one or more options, selection unit 210 can execute a module embodied in a group of computer-executable instructions encoded in memory 250 as part of module storage 256. One exemplary module can be a Trailer Fabrication Spool Creation module.

Selection unit 210 can afford reporting features to packing planning platform 110. In one aspect, selection unit 210 can cause an I/O interface of the I/O interface(s) 230 to render a list conveying a thumbnail graphic of at least one object (e.g., each object) selected by selection unit 210 in accordance with aspects described herein—as an example, the at least one object can be at least one fabrication spools. Optionally, in certain implementations, data representative of an object disclosed in such list can be rendered in association with the thumbnail graphic rendered for the object; such data can comprise weight of the object (e.g., fabrication spool), dimensions of the object (e.g., fabrication spool), a file name that represents the object (e.g., fabrication spool), an identifier of a system embodied in a plurality of objects that comprise the object (e.g., fabrication spool), CG dimensions and location, one or more lifting points of the object (e.g., fabrication spool), or the like. The list (or report) rendered by the I/O interface can be accepted by an end-user of packing planning platform 110; in such scenario, data indicative of acceptance of the list can be received at the packing planning platform 110, e.g., at the I/O interface that renders the list. In the alternative, the list can be rejected and a selection of a plurality of objects can be modified. When the user is satisfied with the appearance of this report they need to create a new set of drawings.

In one implementation, to cause the I/O interface to render the data indicative of the set of such one or more options, selection unit 210 can execute a module embodied in a group of computer-executable instructions encoded in memory 250 as part of module storage 256. The module can be a Fabrication Spool Pick List module. In one aspect, execution of module can cause packing planning platform 110 to perform at least two integrity checks related to a pick list of objects (e.g., fabrication spools). A first integrity check can comprise computing a total weight of all objects (e.g., fabrication spools) selected for loading. A second integrity check comprises validating the dimensions of a group to objects in order to ensure that group of object can fit within the bound of dimensional envelope defined by structural features (e.g., height, length, width) of a container are within the bounds of the dimensional envelope for the container (e.g., container 130). Providing integrity checks such as those illustrated herein can provide an end-user of packing planning platform 110 with actionable information related to a current weight selection and a size selection with respect to a maximum allowable weight capacity of the trailer and a dimensional envelope of the container (e.g., a trailer, a rail car, a sea container).

As described herein, through data included in packing specification(s) 112, selection unit 210 can extract a plurality of parameters associated with a container (e.g., container 130) that can be employed for transportation or storage of the at least a portion of a plurality of irregular-shaped objects selected by selection unit 210 as described herein. Such plurality of parameters or a portion thereof can be retained in one or more memory elements 254, represented in FIG. 2 as container model(s) 254. In an aspect, the plurality of parameters can include a length of the container (a trailer, a rail car, a sea container, etc.), height of the container, and a width of the container. In another aspect, the plurality of parameters can include a weight capacity of the container. In yet another aspect, the parameters can include one or more of height, length, width, weight capacity, and the number of axles of a trailer. The height, the width, and the weight capacity define a size of a trailer and the size of the trailer can be utilized to compute the center of gravity. For trailers that transport payload through the Interstate Highway System, sequence generator 220 can determine data integrity by comparing data indicative of structural or operational features of the trailer are suitable for transportation or storage (e.g., within the bounds of regulatory statutes); for instance, sequence generator 220 can compare such data with, for example, a range of 48 feet to 53 feet for length; a maximum width of 8 ft. and 6 inches, a range of 13 ft 6 in to 14 ft 6 in for height; maximum weight consistent with 20,000 pounds for a single axle trailer, 34,000 pounds for a tandem axle 34,000 pounds, or a gross vehicle weight of 80,000 pounds, or a weight upper bound arising from the so-called Bridge Formula:

$$W = 500\left[\frac{LN}{N-1} + 12N + 36\right], \quad \text{Eq. (1)}$$

wherein W is the overall gross weight on any group of two or more consecutive axles rounded to the nearest 500 pounds, L is the distance in feet between the outer axles of any group of two or more consecutive axles, and N is the number of axles in the group under consideration.

In one or more implementations, selection unit 210 can execute at least one module, which can be embodied in a set of computer-readable computer-executable instructions and can be retained in module storage 256 in memory 250. In one embodiment, module storage 256 can comprise a plurality of modules: (1) Pipe System Tagging module; (2) Fabrication Spool Data Extraction module; (3) Trailer Center of Gravity Calculation module, (4) Fabrication Spool Attribute Tagging; (5) Trailer Fabrication Spool Creation; (6) Trailer Layout Creation; (7) Trailer Cribbing Specification and Creation module, which can comprise two modules including a first module directed to manual placement of cribbing and a second module directed to automatic placement of cribbing; (8) Deliverable Output Creation module.

In exemplary embodiment 200, packing planning platform 110 can include a sequence generator unit 220 (also referred to as sequence generator 220). For a specific container (e.g., a trailer, a rail car) and for a set of irregularly-shaped objects (e.g., objects 120), sequence generator 220 can generate a plan for loading the set of irregularly-shaped objects into the container. The plan for loading the container can determine a sequence for loading the container. As described herein, such sequences for loading the container is referred to as optimized sequence. In one aspect, the optimized sequence can be a optimal sequence that maximizes a packing efficiency metric Π which can be a function of one or more factors (e.g., variables). It should be appreciated that maxima of Π can be local maxima rather than a global maximum. Such factors can comprise design of objects to be loaded into a container, available open space in the container, constraint on an amount of open space that is allowed to be present within the container, loading site conditions, unloading site conditions, conditions for manufacturing the objects, cost of loading (e.g., expense and time consumed to load object(s)), cost of unloading (e.g., expense and time consumed to load object(s)), or the like. In another aspect, the optimized sequence can be non-optimal in that it does not maximize the efficiency metric Π neither globally nor locally. Instead, the non-optimal sequence can be a sequence having a value $\Pi_0$ that is the largest value for a specific set of constraints—e.g., values of the various factors that define Π reside within a limited domain of the variables that define Π.

In one aspect, the sequence generator 220 can generate the optimized sequence based on at least the weight, the center of gravity, the shape of each of the irregularly-shaped objects in a set and parameter(s) associated with the container. In another aspect, to generate the optimized sequence, sequence generator 220 can calculate a center of gravity of the set of irregularly-shaped objects in a loaded assembly or configuration.

In one aspect, sequence generator 220 can generate the optimized sequence by updating a computed assembly through positioning and re-positioning the set of irregularly-shaped objects in the container (e.g., a trailer, rail car, sea container), so that the center of gravity of the set of irregularly-shaped objects in an updated assembly is less than a predetermined distance from the center of gravity of the container. The predetermined distance can be a percentage of the magnitude of the position vector of the center of gravity of the container. Accordingly, generation of the optimized sequence can be iterative, converging after a packing efficiency criterion embodied in the distance from the center of gravity of an assembly of irregularly-shaped objects to the center of gravity of the container is fulfilled. Other packing efficiency criteria can be exploited. Various considerations can dictate configuration of a threshold for a specified packing efficiency criterion. In certain embodiments, positioning and re-positioning of the set of irregularly shaped objects (e.g., fabrication spools) in the container can be accomplished automatically, wherein sequence generator 220 updates a position of at least one irregularly-shaped object of the set according to a predetermined update rule. Update rules can be stored as part of data storage 258; for instance, a library of rules that defines one or more position update schemes can be stored in data storage 258. In other embodiments, positioning and re-positioning of the set of irregularly shaped objects (e.g., fabrication spools) in the container can be accomplished in response to input data representative of a position of at least one irregularly-shaped object of the set of irregularly-shaped objects. In one aspect, an I/O interface of the I/O interface(s) 230 can enable collection of such input data by rendering at least one GUI that permits data entry through a gesture (touch, speech, keystroke, etc.). Optionally, the at least one GUI can render indicia that can simplify entry and accuracy of data related to position of an object in a container (e.g., trailer); for example, the at least one GUI can render a grid layer (e.g., a 5 ft×5 ft grid layer) overlay rendered on the bed of a trailer that embodies the container. The grid layer can permit accurate placement of an object (e.g., a fabrication spool) on the trailer. The I/O interface of the I/O interface(s) 230 can toggle such indicia ON or OFF in response to reception of suitable data as part of packing spec(s) 112. In another aspect, the input data indicative of a relocation of an object in a container can convey a change in an initial position that can be intended to allow correct placement of cribbing in the container.

Sequence generator 220 can receive data indicative of structural or operational features of a container to be loaded with a plurality of irregularly-shaped objects. Such data can be received as part of packing specification(s) 112 and can be utilized to compute a center of gravity of the container. As described herein, the data can convey predefined values related to predefined containers available for loading. Optionally, the data can convey values related to customized containers specifically intended for loading the plurality of irregularly-shaped objects. Sequence generator 220 can compute a center of gravity of the container based at least on a portion of such data. A result of computation of the center of gravity can be retained in memory 250 as part of data storage 258. In one exemplary implementation, sequence generator 220 can execute a module to compute a center of gravity for a container, for the one or more objects, and for the container loaded with the one or more objects; execution of such module can enable determination of a center of gravity as described herein. The module can be retained in module storage 256 as a set of one or more groups of computer-executable instructions. As an example, the module can be characterized as a Trailer Center of Gravity Calculation module.

In certain implementations, generation of an optimized sequence for loading a plurality of objects (e.g., objects 120) into a container can be constrained to one or more loading schemes that establish a particular, yet not exclusive, manner of loading the container. Sequence generator 220 can receive, via one of the I/O interface(s) 230, data indicative of a specific loading scheme; for instance, packing spec(s) 112 can include such data. Based at least on the data indicative of the specific loading scheme, sequence generator 220 can generate the optimized loading sequence for loading the plurality of objects (e.g., fabrication spools). Optionally, sequence generator 220 can generate the optimized loading sequence according to a predetermined (or default) loading scheme. An exemplary loading scheme comprises loading according to predetermined pair of load/unload sequences, such loading scheme can be exploited in scenarios in which the plurality of objects pertain to disparate originating sources or disparate receiving sources. Another exemplary loading scheme comprises grouping objects with similar or identical structural features. For example, objects with similar or identical size (e.g., small objects) can be grouped. For another example, straight fabrication spools can be grouped. For yet another example, fabrication spools with similar or identical configurations can be grouped. For still another example, fabrication spools with valves assembled thereon can be grouped. Yet another exemplary loading scheme comprises loading objects according to assembly restrictions, such as stacking restrictions, which can prevent certain object(s) from having disparate object(s) stacked thereupon. Still another exemplary loading scheme can comprise grouping objects according to an intended location of a destination; for instance fabrication spools intended for a specific floor or area in a building can be grouped in a loading sequence.

Certain loading schemes can contemplate loading objects into one or more zones of the container. In one aspect, the loading scheme also can determine a subset of the one or more zones as zone(s) that are allowed to be utilized for loading. As described herein, data contained in packing spec(s) 112 can include data that configures the one or more zones and whether such zone(s) are allowed for loading. In addition, data received as part of packing spec(s) 112, can configure the one or more zones as zones that can be arranged for suitable (optimal, nearly-optimal, intended, etc.) placement of objects in the container based at least on geometry and weight. A zone that is configured as a zone that can be arranged for suitable placement of objects is a zone that can be relocated from a first configuration to a second configuration within the trailer. In another aspect, a threshold of how much open space is allowed on a zone can be configured (e.g., defined and stored in memory 250); such threshold can allow placement of as many objects (e.g., fabrication spools) compatible with space available to the zone. In the subject disclosure, a zone is a region of the container that can be defined logically or it can be delimited physically (e.g., physical boundaries in the container determine a space assigned to a zone), wherein the zone spans at least a portion of the volume of the container. One or more zones can be configured (logically or physically) in a level in the container; a level with a single zone is a zone.

In one or more implementations, sequence generator 220 can execute a module, which can be embodied in a set of computer-readable computer-executable instructions and can be retained in module storage 256 in memory 250. Execution of the module can implement the described functionality of sequence generator 220.

Sequence generator 220 also can generate an optimized sequence for loading cribbing into the container, to secure the set of irregularly-shaped objects in place. Such optimized sequence establishes placement of cribbing structure in the container. In an embodiment, a suitable assembly associated with a sequence for loading cribbing can be retained in memory 250 as a cribbing template, which can be suitable for transportation or storage of payload (e.g., plurality of objects 120) that is repetitive and thus may cause limited variations in cribbing. In one aspect, sequence generator 220 can automatically generate the optimized sequence for loading cribbing into the container. In one or more implementations, sequence generator 220 can generate the optimized sequence for loading cribbing through execution of at least a portion of a module, which can be embodied in a set of computer-readable computer-executable instructions and can be retained in module storage 256 in memory 250. As an example, sequence generator 220 can execute at least a portion of a Trailer Cribbing Specification and Creation module. In another aspect, in response to execution of at least the portion of the Trailer Cribbing Specification and Creation module, packing planning platform 110, via sequence generator 220, can generate data indicative of details of cribbing and data indicative of a layout of cribbing which can enable, at least in part, prefabrication of cribbing. In yet another aspect, sequence generator 220 can receive data indicative of placement of cribbing into the container from user equipment (mobile or otherwise). Such data can be received as part of packing spec(s) 112.

In general, shipping and related loading and unloading of payload (e.g., a plurality of object 120) can benefit from deployment of cribbing under or over one or more objects that embody the payload, and between loading zones holding the one or more objects. In an aspect, packing planning platform 110 can retain data indicative of standard sizes, standard materials, or standard shapes for the cribbing; the packing planning platform 110 can receive such data from user equipment (mobile or otherwise) and thus enable a user (a human agent, a machine, etc.) to create and pre-load the data into the packing planning platform 110. Availability of the data indicative of standard sizes, standard materials, or standard shapes can permit packing planning platform 110 to select an adequate option (e.g., best option, second best option, third best option, or the like) for cribbing. In an aspect, of installation (e.g., provisioning, acceptance, and the like) of packing planning platform 110, data storage 258 can be supplied with data indicative of standard lumber cribbing or other cribbing materials. As described herein, optionally, an end user can customize (augment, reduce, erase, etc.) such data. In one exemplary scenario, packing planning platform 110 can receive, from user equipment, data indicative of custom cribbing structure(s) that supplement data related to standard cribbing structures and retained in data storage 258.

As an example, packing planning platform 110, via sequence generator 220, can generate a sequence for loading cribbing with triangular section (either hollow or solid) against a plurality of fabrication spools to ensure such spools do not roll or otherwise displace. Optionally, sequence generator 220 can generate a sequence for loading cribbing to be deployed against irregularly-shaped objects other than fabrication spools.

In one aspect, sequence generator 220 can update an optimized sequence for loading cribbing in response to addition or removal of a payload object and simulated (e.g., computed) interaction of the payload object with cribbing that is part of such optimized sequence. In another aspect, sequence generator 220 can update an optimized sequence for loading a plurality of irregularly shaped objects (e.g., fabrication stools) in response to addition or removal of a cribbing structure.

The optimized sequence for loading the set of irregularly-shaped objects into the container can be further based on a predetermined unloading sequence. As described herein, unloading conditions can determine at least one constraint that can dictate suitability (e.g., packing efficiency) of a specific loading sequence and related loaded assembly, e.g., a specific arrangement of objects loaded into a container.

In the illustrated embodiment (see FIG. 2), packing planning platform 110 also includes a layout generator unit 240 (also referred to as layout generator 240). In an aspect, layout generator 240 can cause I/O interface(s) 230 to render (e.g., display) a map depicting the optimized sequence for loading the set of irregularly-shaped objects into the container. Similarly, yet not identically, layout generator 240 can cause I/O interface(s) 230 to render (e.g., display) a map depicting the optimized sequence for loading the set of irregularly-shaped objects into the container and the optimized sequence for loading cribbing into the container. In embodiments in which the positioning and re-positioning of each object of the set of the irregularly-shaped objects into the container is accomplished automatically as described herein, such maps can be rendered as a static rendition of a loaded container, or as an animation displaying the loading sequence as objects are positioned and re-positioned within the truck.

In one aspect, layout generator 240 can execute at least a portion of a module retained in module storage 256 and, in response, cause one of I/O interface(s) 230 to render the foregoing maps. As an example, the module can be a Deliverable Output Creation module that, in response to execution by layout generator 240, can cause an I/O interface to render at least a portion of the following exemplary content: (1) A three-dimensional (3D) isometric view of a loaded container (e.g., a trailer; see FIG. 7C). (2) A two-dimensional (2D) view (e.g., a top view, a left-side view, a right-side view, or a back view) of the loaded container (e.g., a trailer) with and without the grid layer turned on. (3) A 2D cut-away view of each loading zone within the container (e.g., trailer; see FIG. 7A, diagram 740) with an overlaid reference grid to present spool(s) placement—an option to convey underlying loading zones in a stack of loading zones can be available and, optionally, another option to toggle on or off (e.g., layer control) the reference grid can be provided. (4) A 2D fan fold layout of the loading zones of the container. (5) A Bill of Material (BOM) for at least a certain (e.g., all) cribbing pieces (see, e.g., FIG. 8G). In an aspect, generation of the BOM can create a drawing, or other type of rendition such as a three-dimensional (3D) model, sculpture or a hologram, conveying at least the certain cribbing pieces with dimensions for the specific load. (6) A fabrication spool designation report (see, e.g., FIG. 7D). In certain implementations, such report can be a letter-sized report that shows a thumbnail view of each fabrication spool with an associated tag or tag identifier (e.g., a number). (7) A rendition (a two-dimensional drawing, a 3D model, a sculpture, a hologram, etc.) illustrating top view(s) of the loading zones and related bill of material. (8) A drawing showing placement of the cribbing with the bill of material (see, e.g., FIG. 8F).

Figure 3:
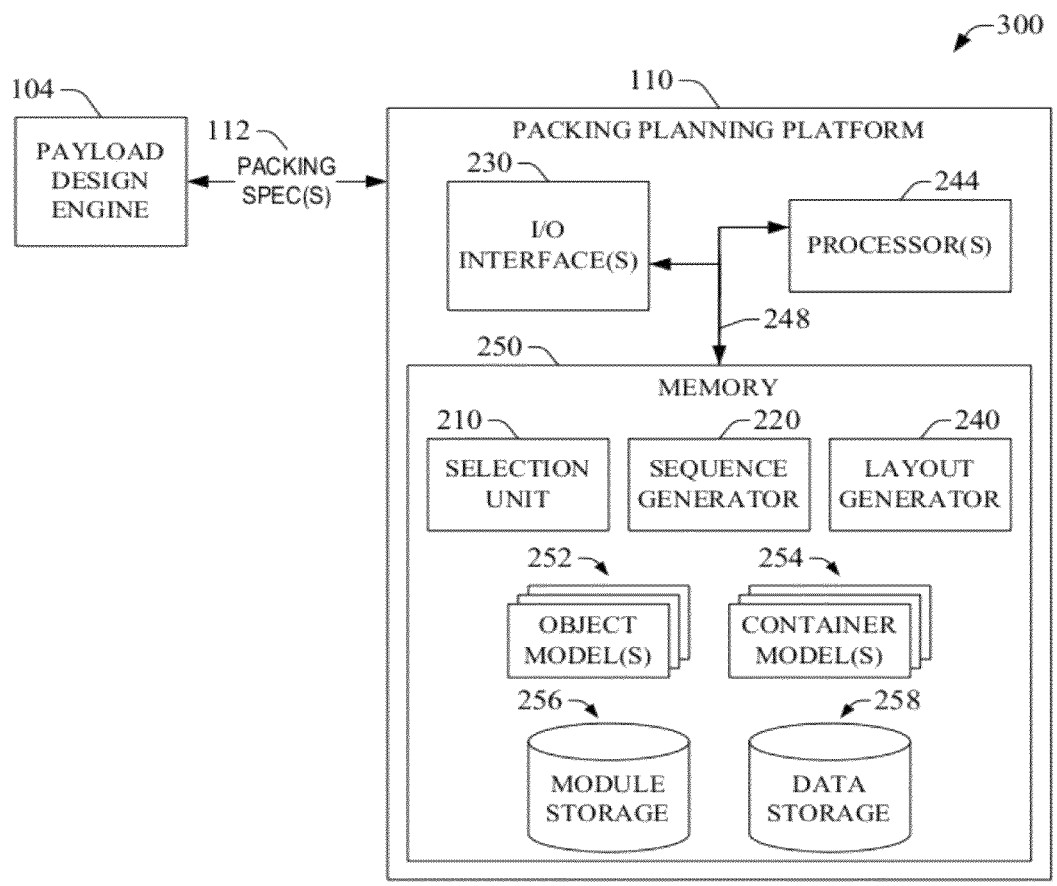

FIG. 3 illustrates a block diagram of an exemplary embodiment 300 of packing planning platform 110 in accordance with aspects of the subject disclosure. In such exemplary embodiments, selection unit 210, sequence generator 220, and layout generator 240 are retained in memory 250. In an aspect, each of such units is embodied in a set of computer-readable computer-executable instructions that can be executed by processor(s) 244 to accomplish the functionality described herein. While selection unit 210, sequence generator 220, and layout generator 240 are depicted as external to module storage 256, such functional elements can be embodied in respective modules or respective group of modules which can be executed by processor(s) 244 to accomplish the functionality of packing planning platform 110.

Figure 4:
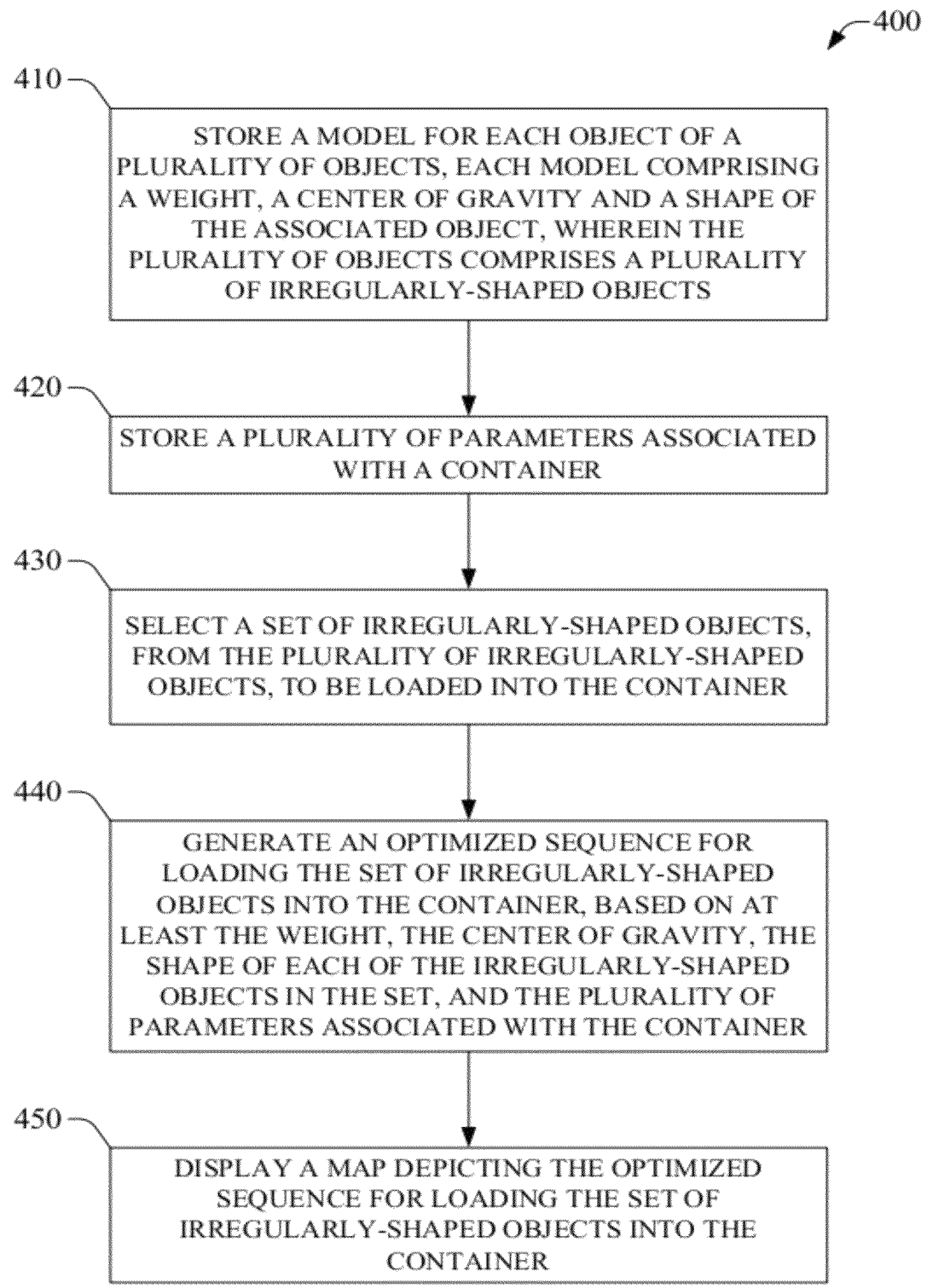
FIGS. 4-5 illustrate exemplary methods for generating a plan for loading a container in accordance of the subject disclosure.
Figure 5:
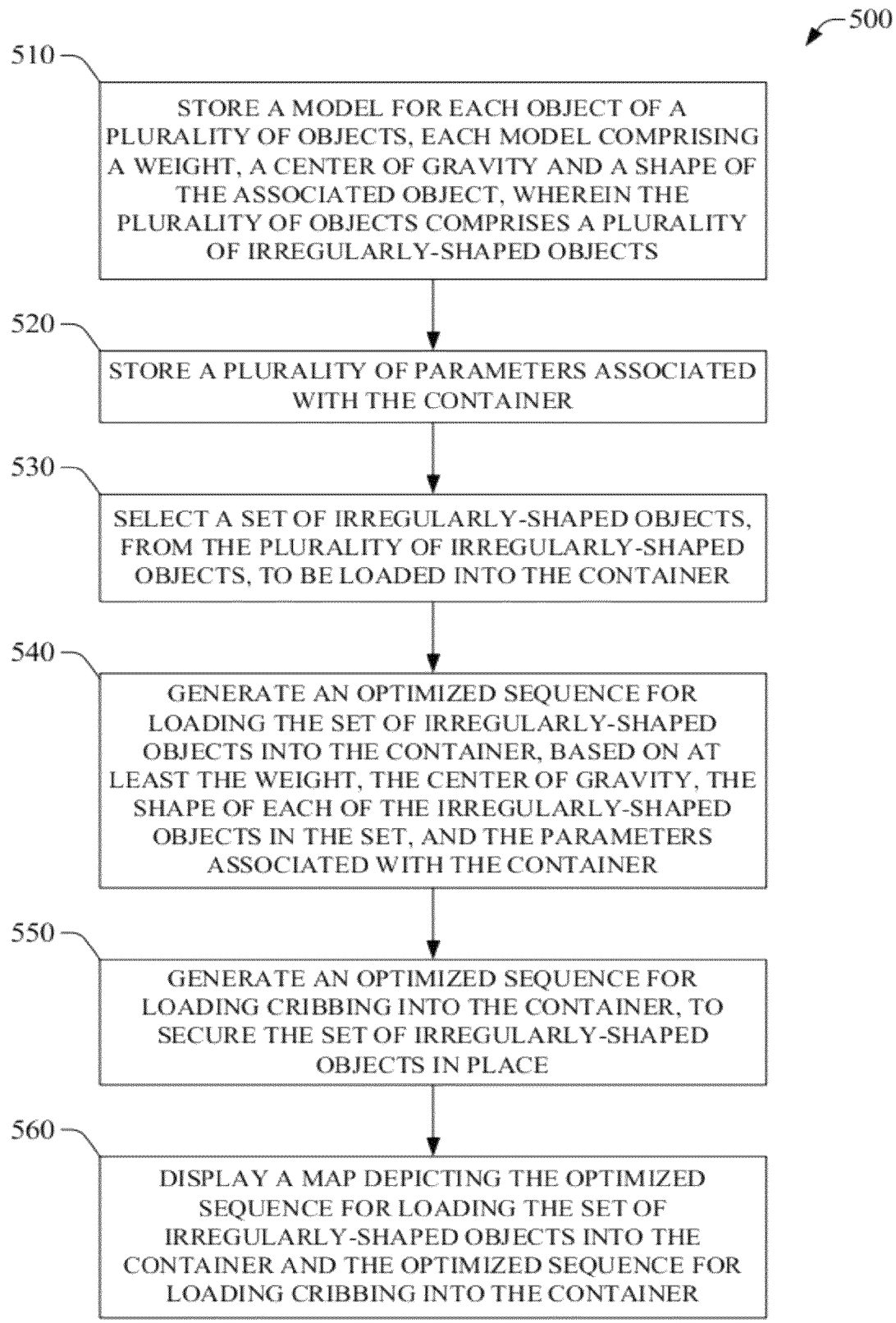

In view of the aspects described hereinbefore, an exemplary method that can be implemented in accordance with the disclosed subject matter can be better appreciated with reference to the flowchart in FIGS. 4-5. For purposes of simplicity of explanation, the exemplary method disclosed herein is presented and described as a series of step; however, it is to be understood and appreciated that the claimed subject matter is not limited by the order of steps, as some steps may occur in different orders and/or concurrently with other steps from that shown and described herein. For example, the various methods or processes of the subject disclosure can alternatively be represented as a series of interrelated states or events, such as in a state diagram. Moreover, when disparate functional elements (e.g., units, devices, or the like) implement disparate portions of the methods or processes in the subject disclosure, an interaction diagram or a call flow can represent such methods or processes. Furthermore, not all illustrated steps may be required to implement a method in accordance with the subject disclosure. Further yet, two or more of the disclosed methods or processes can be implemented in combination with each other, to accomplish one or more features or advantages described herein. It should be further appreciated that the exemplary methods disclosed throughout the subject specification can be stored on an article of manufacture, or computer-readable medium, to allow transportation and transfer of such methods to computers or other computing devices for execution, and thus implementation, by a processor or for storage in a memory.

FIGS. 4-5 illustrate, respectively, flowcharts of exemplary methods 400 and 500 for generating a plan for loading a container in accordance of the subject disclosure. As described herein, the container can be one of a trailer, a rail car, a sea container, a storage container, a garage, a yard, or the like. It should be appreciated that while exemplary methods 400 and 500 are directed to a plurality of irregularly-shaped objects, the various features of such methods and, more generally, the subject disclosure, also can be employed for generating a plan for loading the container with a plurality of objects that is a combination of irregularly-shaped objects and regularly-shaped objects. In connection with exemplary method 400, at step 410, a model for each of a plurality of irregularly-shaped objects is stored. An irregularly-shaped object of such plurality can be a pipe fabrication spool, a pump, an engine, a valve, other mechanical equipment, or the like. Each model of an object comprises a weight, a center of gravity, and a shape of the object. The plurality of objects comprises a plurality of irregularly-shaped objects. In certain embodiments, the plurality of object further comprises at least one regularly-shaped object. At step 420, a plurality of parameters associated with a container is stored. In an aspect, the plurality of parameters associated with the container includes its length, width, and weight capacity. In another aspect, the plurality of parameters associated with the container includes its weight capacity.

At step 430, a set of irregularly-shaped objects from the plurality of irregularly-shaped objects is selected to be loaded into the container. In one aspect, the set of irregularly-shaped objects can be selected according to various selection criteria. In one example, a selection criterion can be to select all irregularly-shaped objects in the plurality of irregularly-shaped objects. In another example, a selection criterion can be to select specific parts of a specific system having part(s) in the plurality of irregularly shaped objects. In yet another example, a selection criteria can be to select irregularly-shaped objects having the same or substantially the same functionality. In other example, a selection criterion can be to select irregularly-shaped objects of the same or substantially same type (e.g., valves, water condenser, filter, or the like). In certain embodiments, a sub-set of the set of irregularly-shaped objects also can be selected. At step 440, an optimized sequence for loading the set of irregularly-shaped object is generated based on at least the weight, the center of gravity, the shape of each of the irregularly-shaped objects in the set, and the plurality of parameters associated with the container. In one or more embodiments, the optimized sequence for loading the set of irregularly-shaped objects into the container is further based on a predetermined unloading sequence. Step 440 is referred to as a generating step and in certain embodiments it can comprise calculating a loaded center of gravity of the set of irregularly-shaped objects. Such generating step also can comprise positioning the set of irregularly-shaped objects so that the loaded center of gravity of the set of irregularly-shaped objects is less than a desired distance from the trailer center of gravity. At step 450, a map depicting the optimized sequence for loading the set of irregularly-shaped objects into the container is displayed.

Regarding exemplary method 500, at step 510, a model for each of a plurality of objects is stored, wherein the plurality of objects comprises a plurality of irregularly-shaped objects. In certain embodiments, the plurality of object further comprises at least one regularly-shaped object. In an aspect, described hereinbefore, each model of an irregularly-shaped object comprises a weight, a center of gravity, and a shape of the irregularly-shaped object. At act 520, a plurality of parameters associated with a container is stored. At act 530, a set of irregularly-shaped objects from the plurality of irregularly-shaped objects is selected to be loaded into the container. Step 530 is referred to as a selecting step and it is substantially the same as step 430. At act 540, an optimized sequence for loading the set of irregularly-shaped object is generated based on at least the weight, the center of gravity, the shape of each of the irregularly-shaped objects in the set, and the plurality of parameters associated with the container.

At step 550, an optimized sequence for loading cribbing into the container is generated. In an aspect, the cribbing is loaded to secure the set of irregularly-shaped objects in place. At step 560, a map depicting the optimized sequence for loading the set of irregularly-shaped objects into the container and the optimized sequence for loading cribbing into the container. It should be appreciated that in embodiments in which the exemplary method is implemented (e.g., executed by a processor, such as a processor of processor(s) 244 or processor 603), at step 560, a layout or map of irregularly-shaped object(s) and regularly-shaped object(s) can be displayed; see, e.g., FIGS. 7A-7B.

Figure 6:
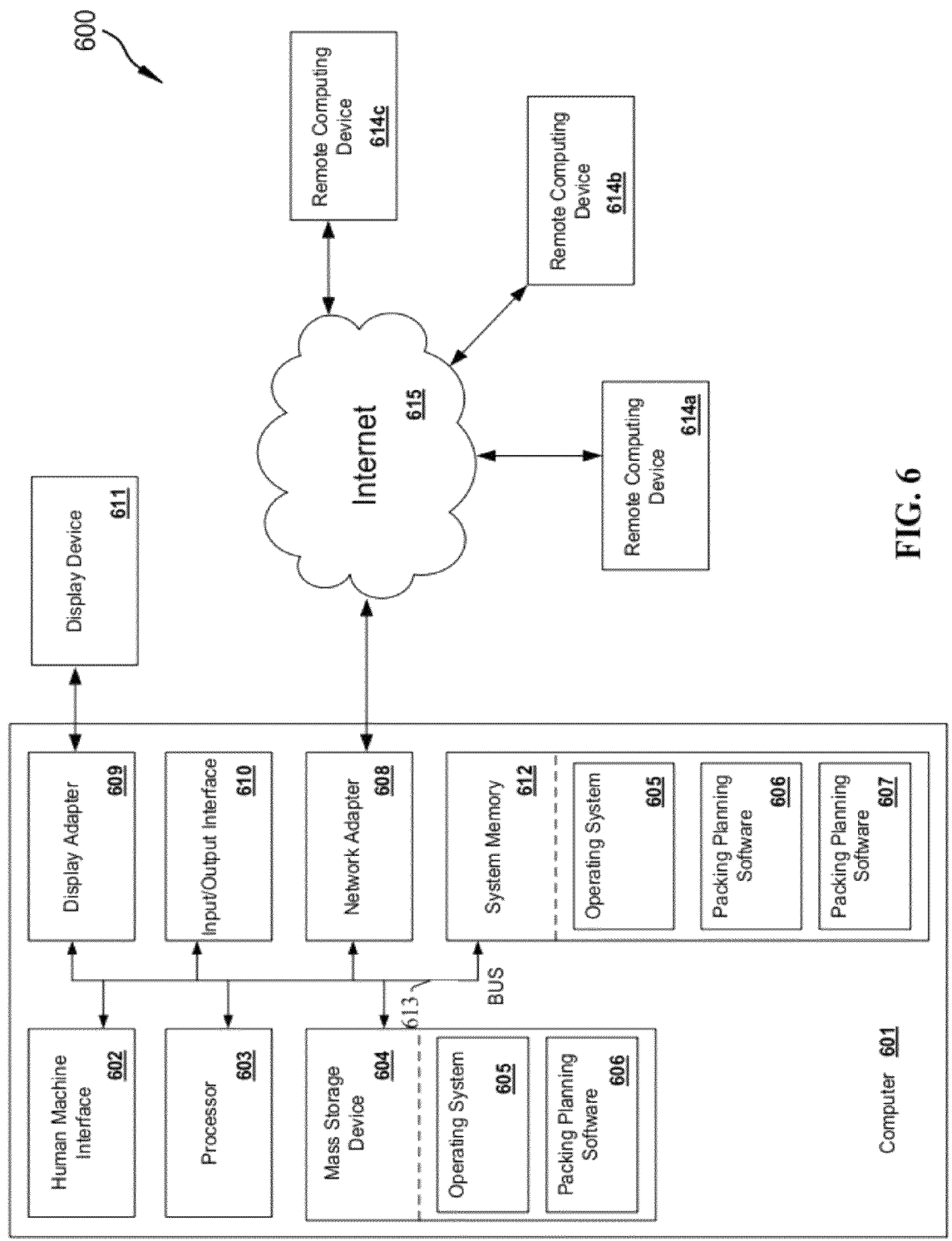
FIG. 6 illustrates a block diagram of an exemplary operating environment that enables various features of the subject disclosure and performance of the various methods disclosed herein.

FIG. 6 illustrates a block diagram of an exemplary operating environment 600 that enables various features of the subject disclosure and performance of the various methods disclosed herein. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The various embodiments of the subject disclosure can be operational with numerous other general purpose or special purpose computing system environments or configurations. Examples of well known computing systems, environments, and/or configurations that can be suitable for use with the systems and methods comprise, but are not limited to, personal computers, server computers, laptop devices or handheld devices, and multiprocessor systems. Additional examples comprise wearable devices, mobile devices, set top boxes, programmable consumer electronics, network PCs, minicomputers, mainframe computers, distributed computing environments that comprise any of the above systems or devices, and the like.

The processing effected in the disclosed systems and methods can be performed by software components in response to execution by a processor (e.g., at least one of processor(s) 244). The disclosed systems and methods can be described in the general context of computer-executable instructions, such as program modules, being executed by one or more computers, or processor(s) thereof, or other computing devices. Generally, program modules can comprise computer code, routines, programs, objects, components, data structures, etc. that, in response to execution, cause the one or more computers or other processing devices to perform particular tasks or implement particular abstract data types. The disclosed methods also can be practiced in grid-based and distributed computing environments where tasks are performed by remote processing devices that are linked through a communications network (e.g., Internet 615). In a distributed computing environment, program modules can be located in both local and remote computer storage media including memory storage devices (e.g., mass storage device 604, or memory 250).

Further, it can be appreciated that the systems and methods disclosed herein can be implemented via a general-purpose computing device in the form of a computer 601. The components of the computer 601 can comprise, but are not limited to, one or more processors 603, or processing units 603, a system memory 612, and a system bus 613 that couples various system components including the processor 603 to the system memory 612. In the case of multiple processing units 603, the system can utilize parallel computing.

In general, a processor 603 or a processing unit 603 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 603 or processing unit 603 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 603 or processing unit 603 also can be implemented as a combination of computing processing units.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description also can be implemented over a wired or wireless network connection and each of the subsystems, including the processor 603, a mass storage device 604, an operating system 605, packing planning software 606 (e.g., transportation planning software, storage planning software, or the like), packing planning data 607 (e.g., transportation planning software, storage planning software, or the like), a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system. In an aspect, packing planning software 606 can comprise packing planning platform 110 and various components therein; such components can be embodied in programming code instructions (e.g., computer-executable computer-readable code instructions) and executed by processing unit 603. Packing planning software 606 and/or packing planning data 607 can configure processor 603, or any other processor(s) described herein to perform one or more of the disclosed methods in accordance with aspects of the subject disclosure.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data and/or program modules such as operating system 605 and packing planning software 606 that are immediately accessible to and/or are presently operated on by the processing unit 603. Operating system 605 can comprise OSs such as Windows operating system, Unix, Linux, Symbian, Android, iOS, Chromium, and substantially any operating system for wireless computing devices or tethered computing devices.

In another aspect, the computer 601 also can comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605, and packing planning software 606. Each of the operating system 605 and packing planning software 606 (or some combination thereof) can comprise elements of the programming and the packing planning software 606. Data and code (e.g., computer-executable instruction(s)) can be retained as part of packing planning software 606 and can be stored on the mass storage device 604. Packing planning software 606, and related data and code, can be stored in any of one or more databases known in the art. Examples of such databases comprise, DB2®, Microsoft® Access, Microsoft® SQL Server, Oracle®, mySQL, PostgreSQL, and the like. Further examples include membase databases and flat file databases. The databases can be centralized or distributed across multiple systems.

In another aspect, the user can enter commands and information into the computer 601 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (RFID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 also can be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

The computer 601 can operate in a networked environment using logical connections to one or more remote computing devices 614a,b,c. By way of example, a remote computing device can be a personal computer, portable computer, a mobile telephone, a server, a router, a network computer, a peer device or other common network node, and so on. Logical connections between the computer 601 and a remote computing device 614a,b,c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and the Internet 615. Networking environments generally can be embodied in wireline networks or wireless networks (e.g., cellular networks, such as Third Generation (3G) and Fourth Generation (4G) cellular networks, facility-based networks (femtocell, picocell, Wi-Fi networks, etc.).

As an illustration, application programs and other executable program components such as the operating system 605 are illustrated herein as discrete blocks, although it is recognized that such programs and components reside at various times in different storage components of the computing device 601, and are executed by data processor(s) or other type of processor(s) of the computer. An implementation of packing planning software 606 can be stored on or transmitted across various forms of computer readable media. Any of the disclosed methods can be performed in response to execution, by a processor (e.g., processor(s) 244 or processor 603), of computer-executable computer-readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 7A:
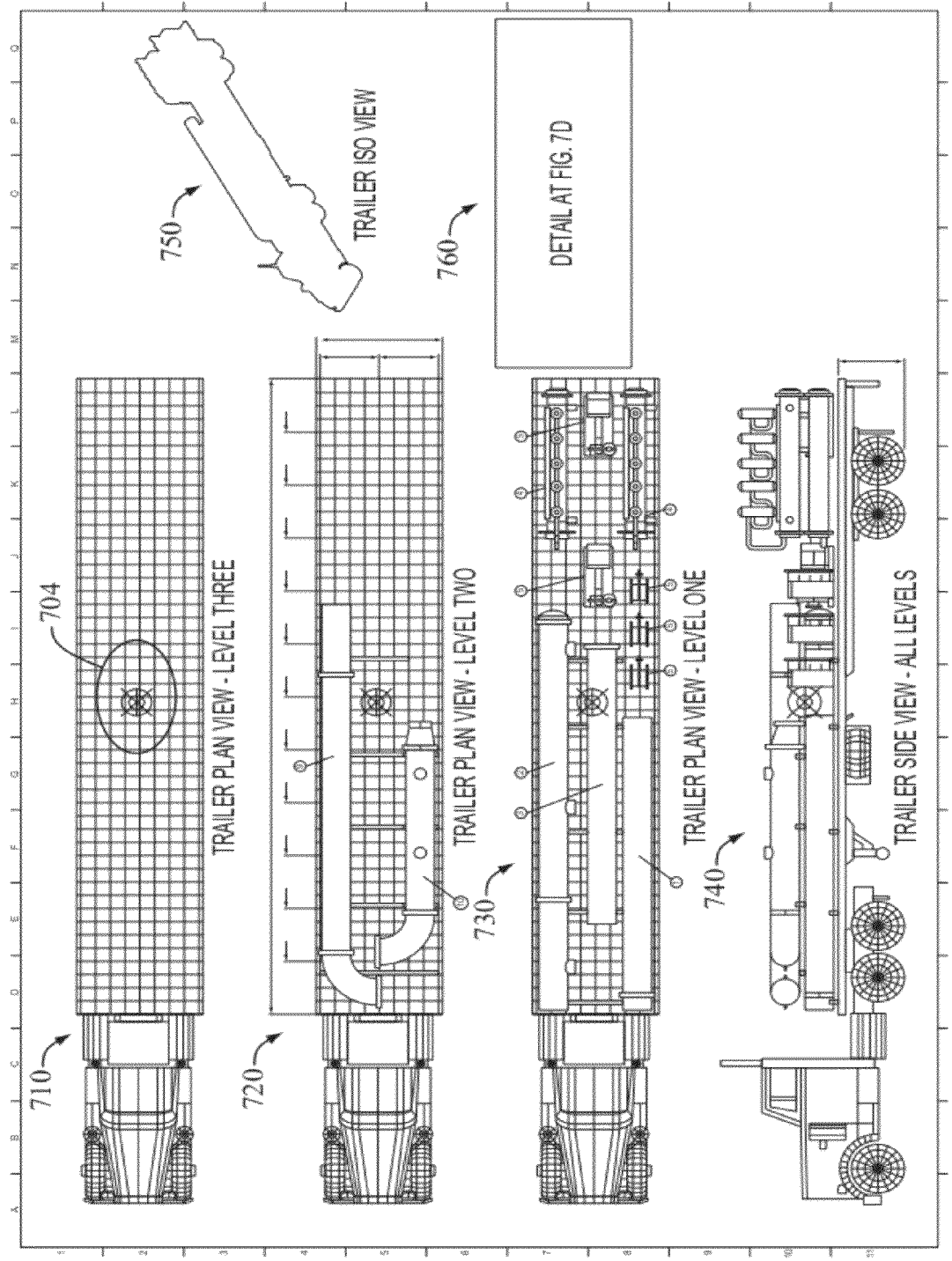
FIG. 7A illustrates a rendering of a report in accordance with aspects of the subject disclosure.
Figure 7B:
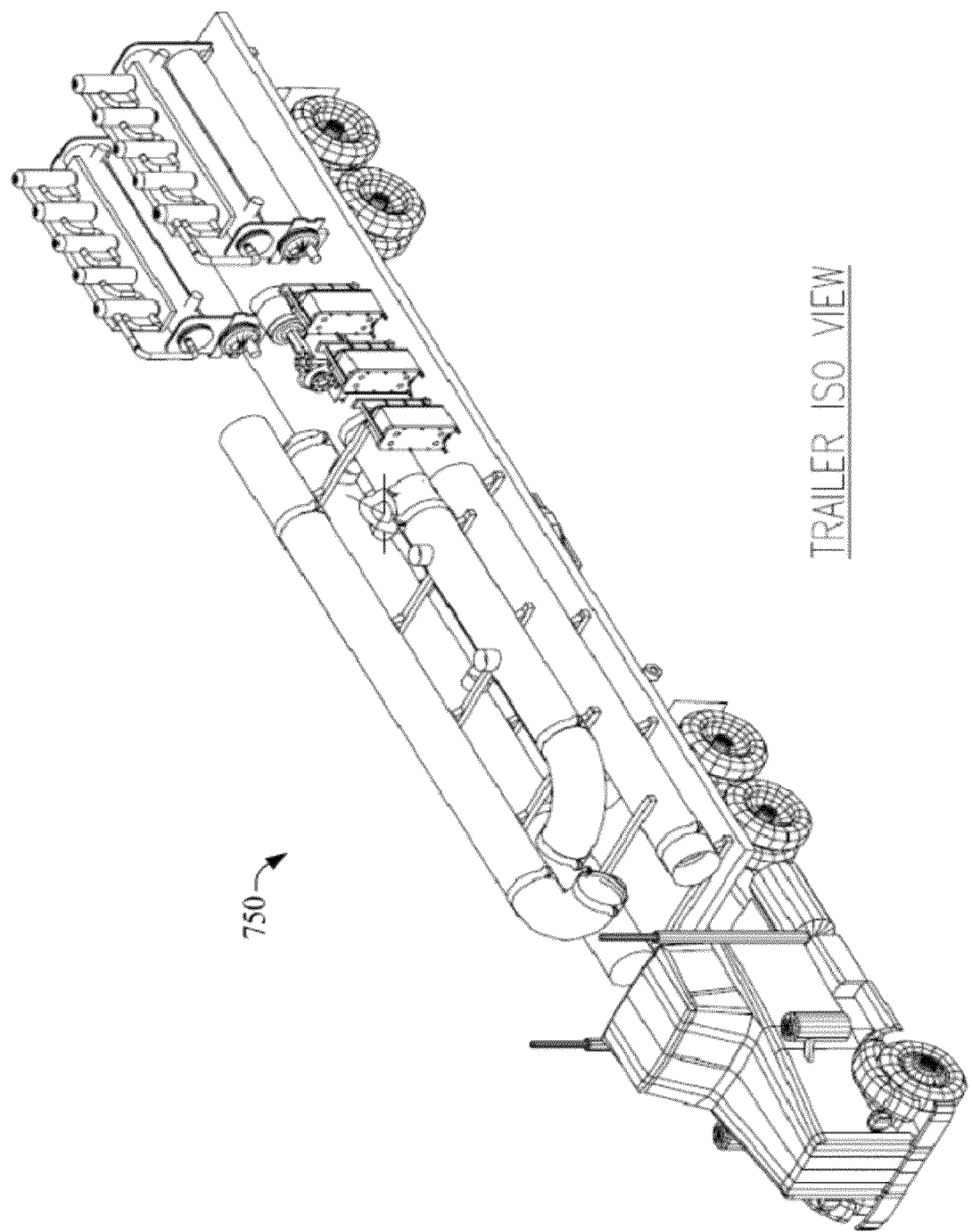
FIGS. 7B-7C illustrates an iso-view of a loaded truck in accordance with aspects described herein.
Figure 7C:
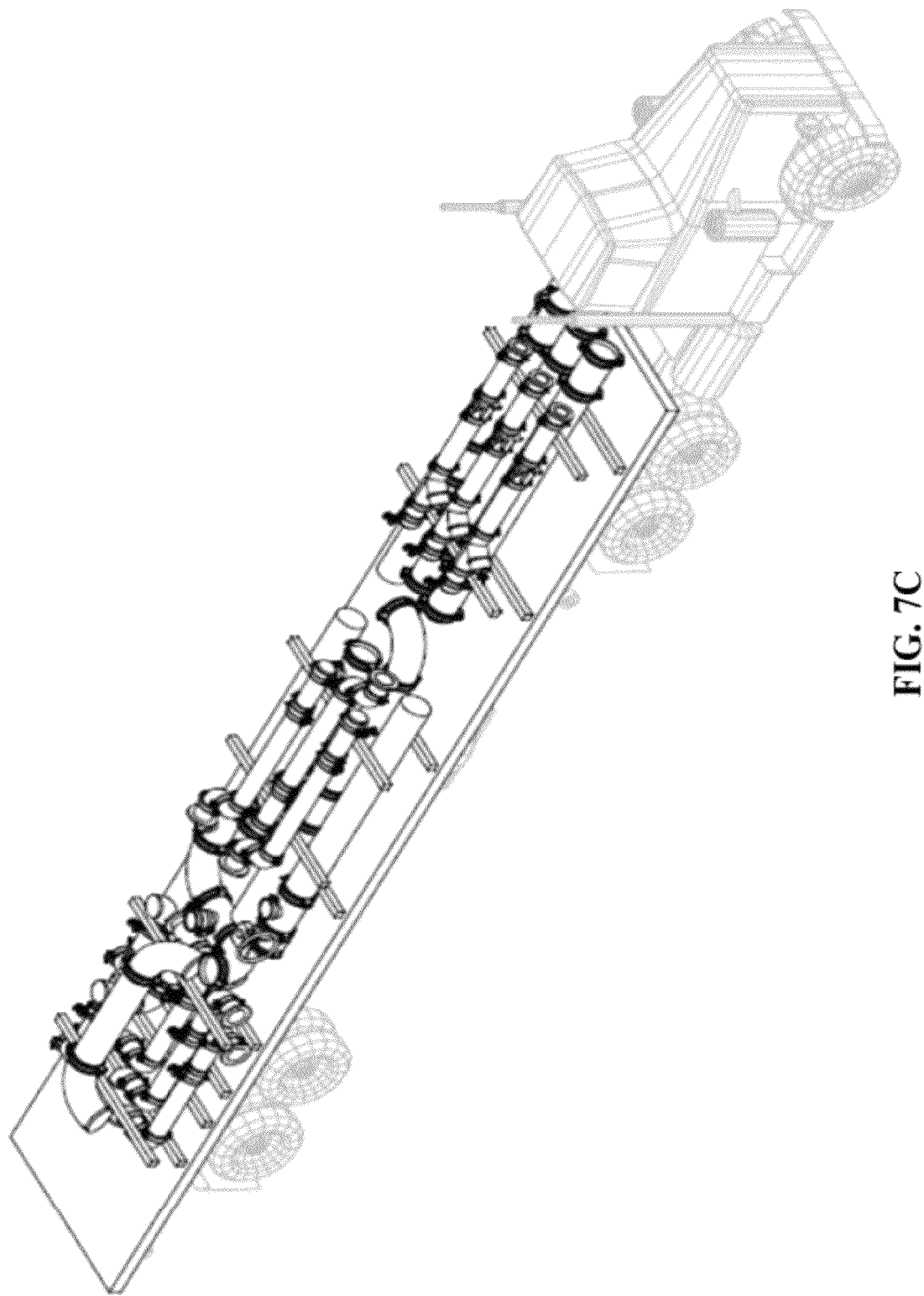

FIG. 7A illustrates a report of a loaded flat-bed trailer (with different views at different levels of load), which embodies a container, loaded with several fabrication spool as conveyed in BOM 760. The feature encircled by the ellipse 704 represents the region in space in which a location of the center-of-gravity (CG) of the flat-bed trailer; size of the cross-hair region represents a predetermined tolerance. As such trailer is loaded indicia is rendered to indicate whether the CG of the trailer as currently loaded is within the tolerance. The flat-bed truck is empty at diagram 710. Diagrams 720 and 730 display the flat-bed truck loaded in two disparate levels represented by each diagram. Such trailer is shown loaded in diagrams 740 and 760 at different levels of loading with different types of objects (fabrication spools and other equipment); cribbing also is shown. FIG. 7B depicts the isometric view shown as part of FIG. 7A, the objects comprising irregularly-shaped objects and regularly-shaped objects. FIG. 7C illustrates an isometric view of a flat-bed trailers (e.g., an exemplary embodiments of a container) loaded with fabrication spools distributed in two levels, or two zones; related cribbing also is rendered. The cribbing can be automatically determined as described herein. FIG. 7D presents the BOM 760 of the flat-bed trailer 750 in FIG. 7A. In one aspect, the BOM 760 conveys the fabrication sequence of various spools and other structure in the loaded flat-bed trailer 750.

Figure 8A:
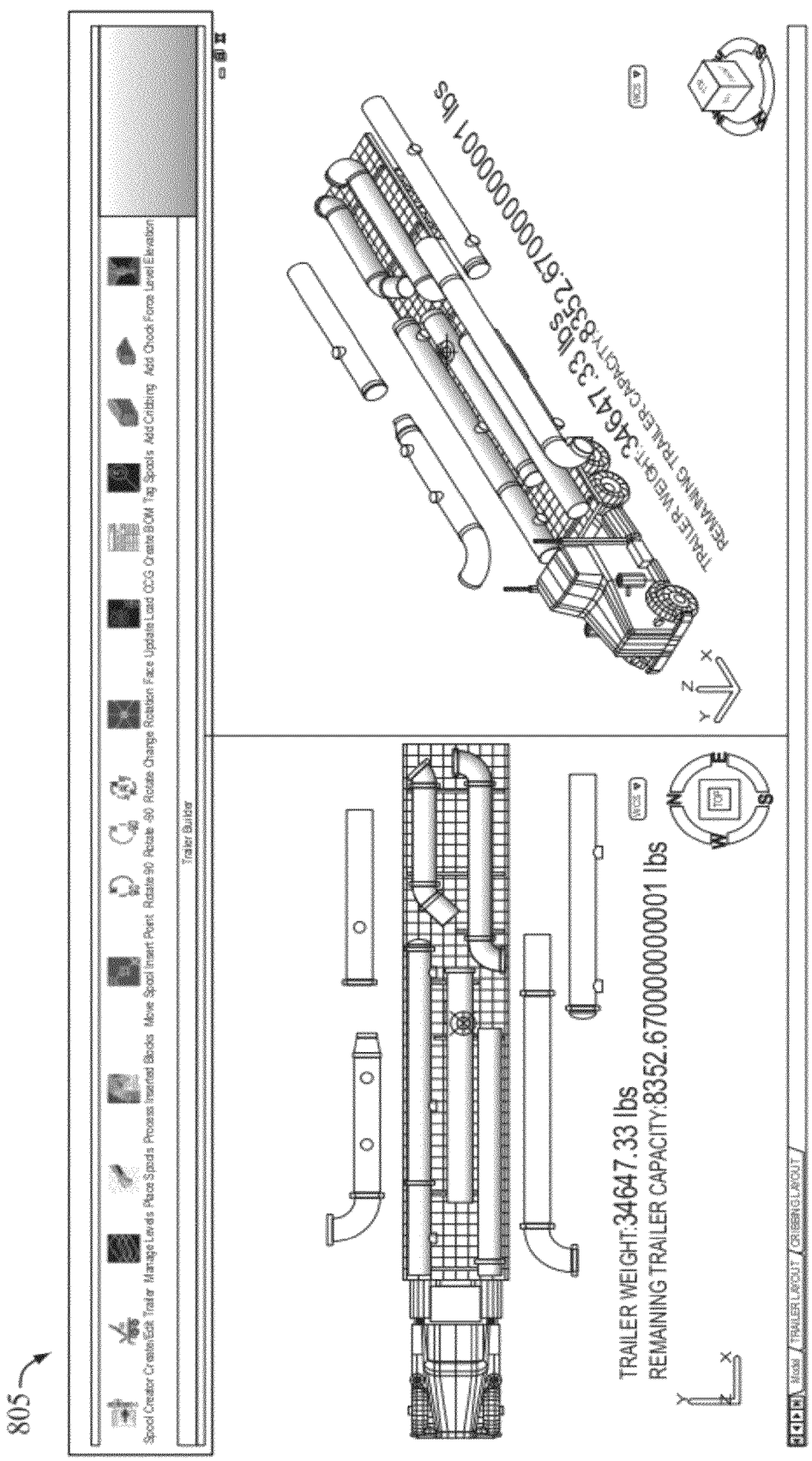
FIGS. 8A-8H present a sequence of renderings that illustrate various aspects of packing planning in accordance with the subject disclosure.
Figure 8B:
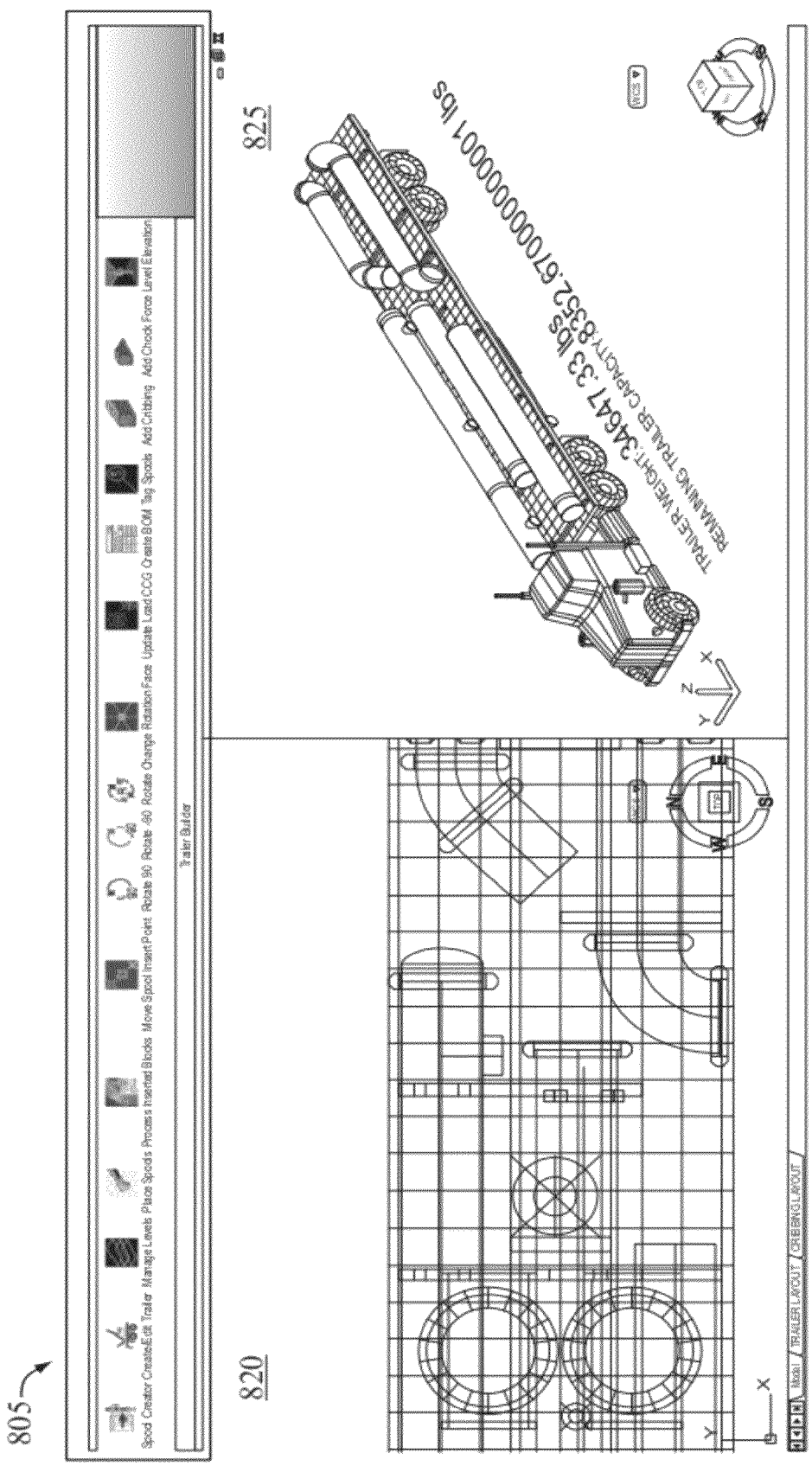
Figure 8C:
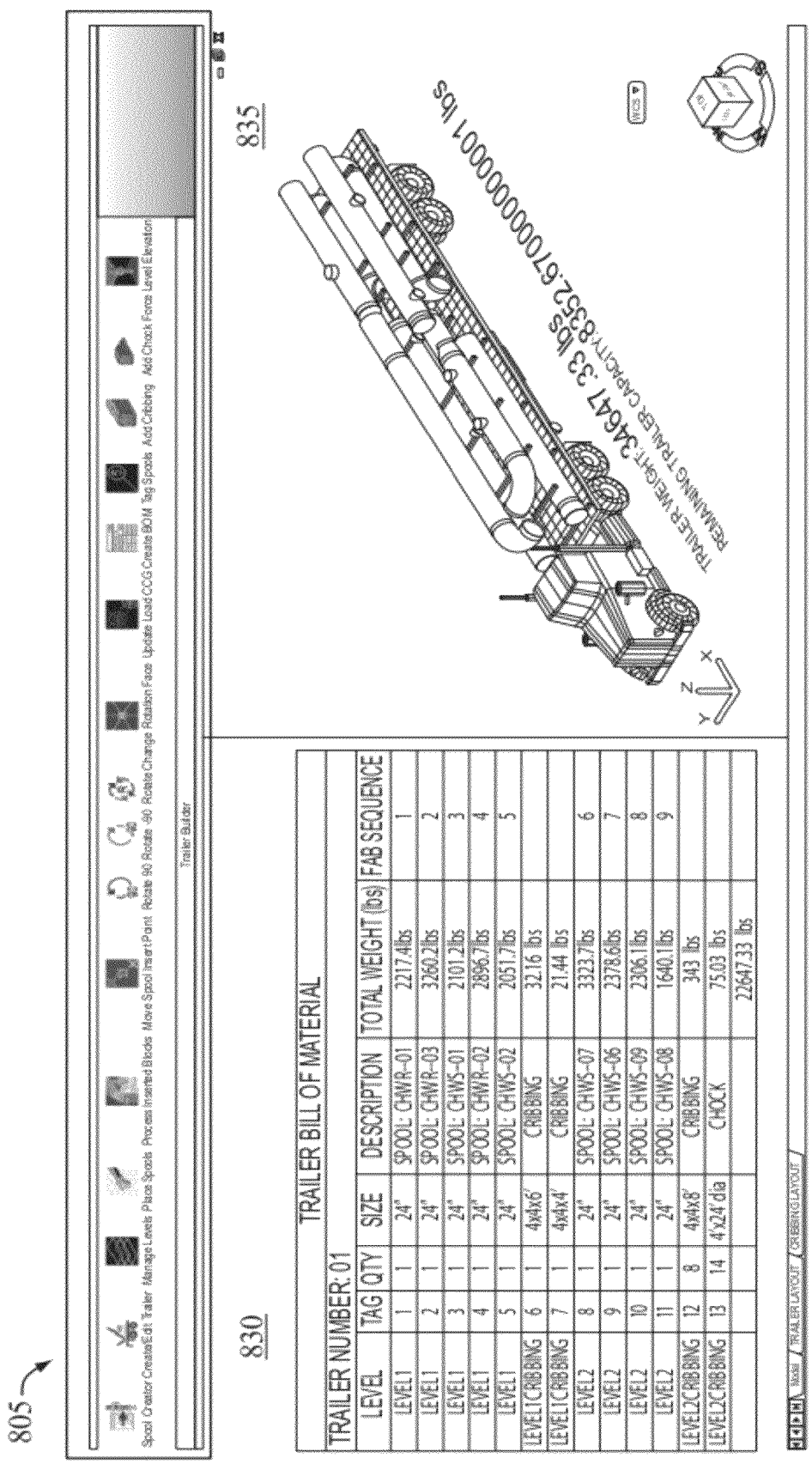
Figure 8D:
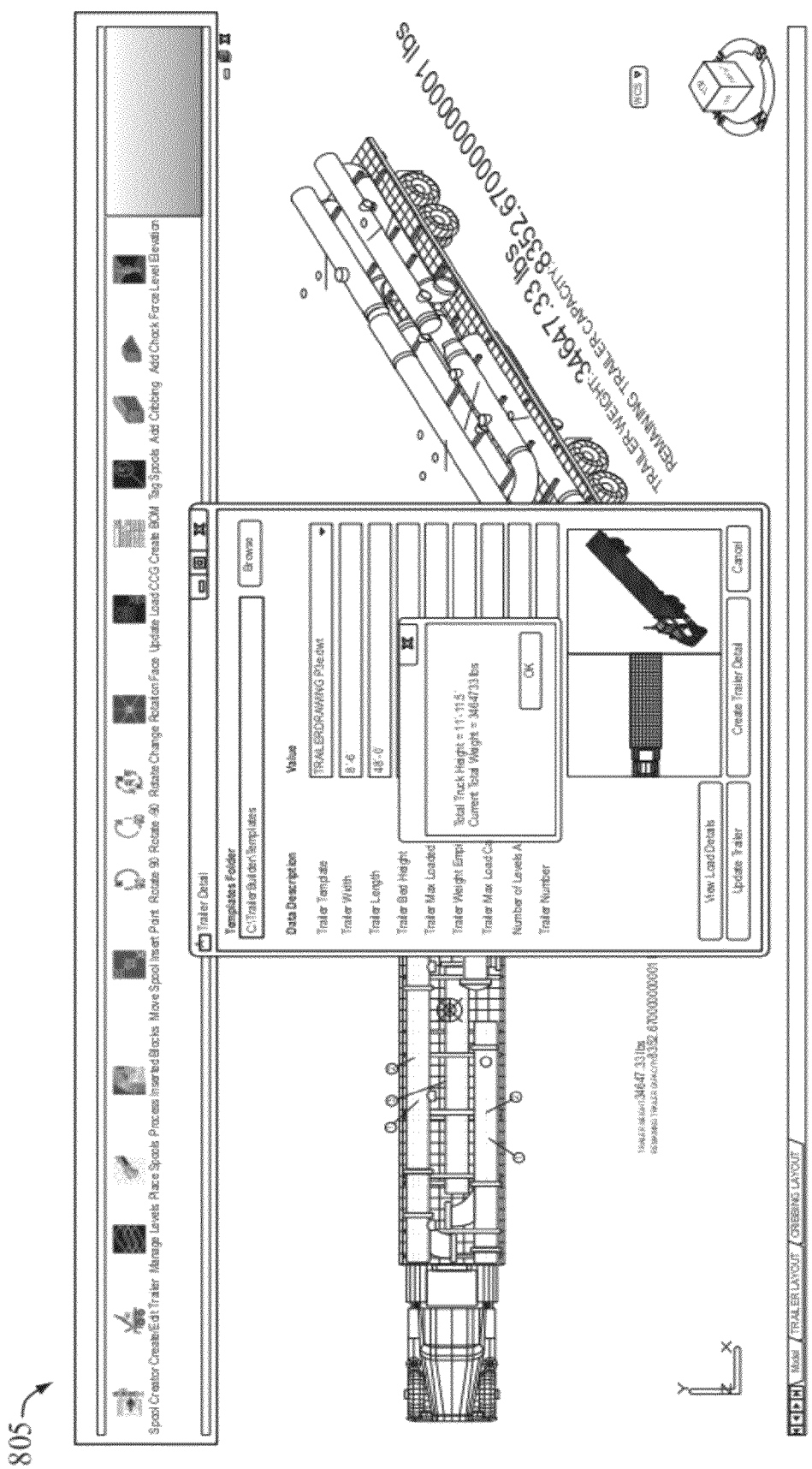
Figure 8E:
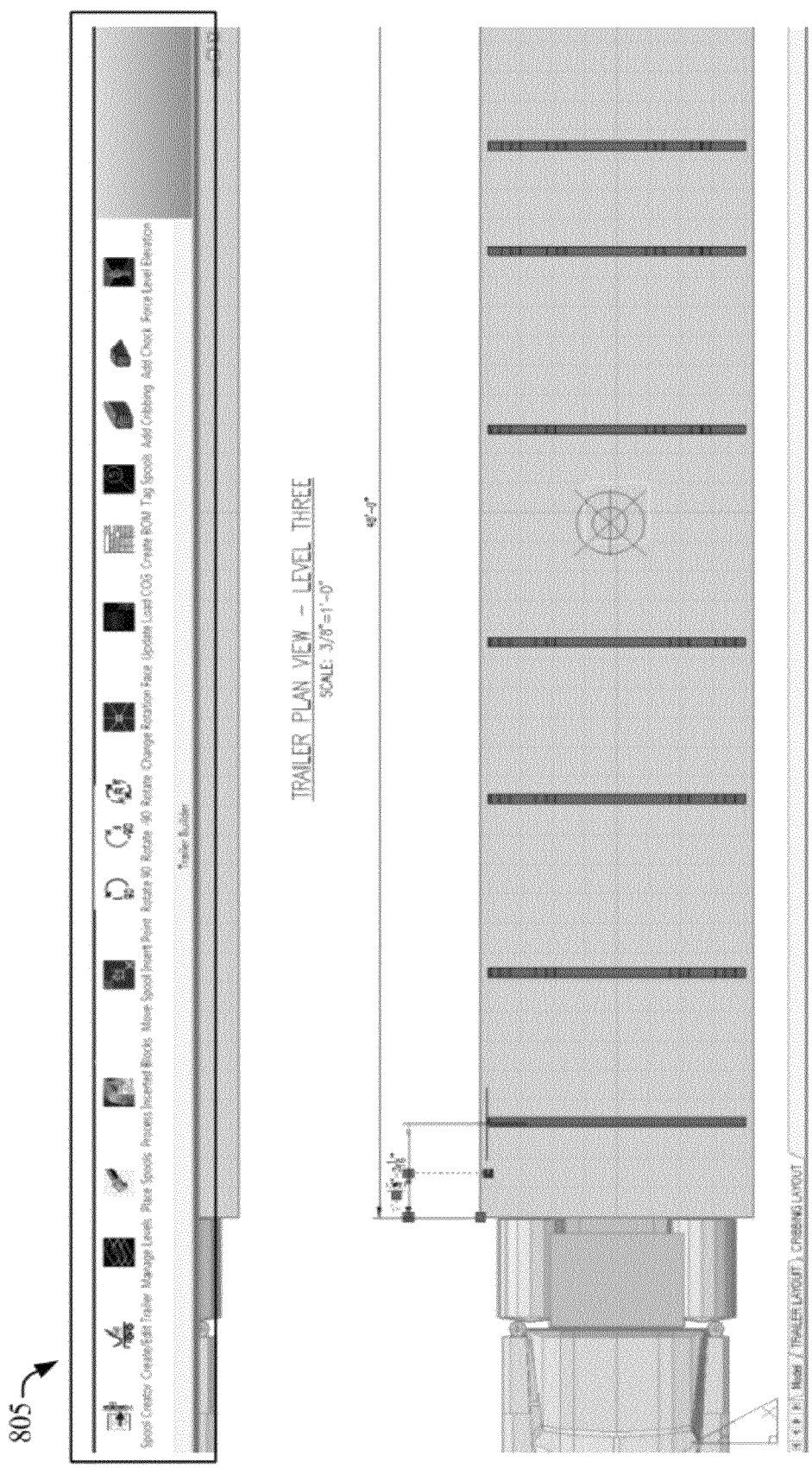
Figure 8F:
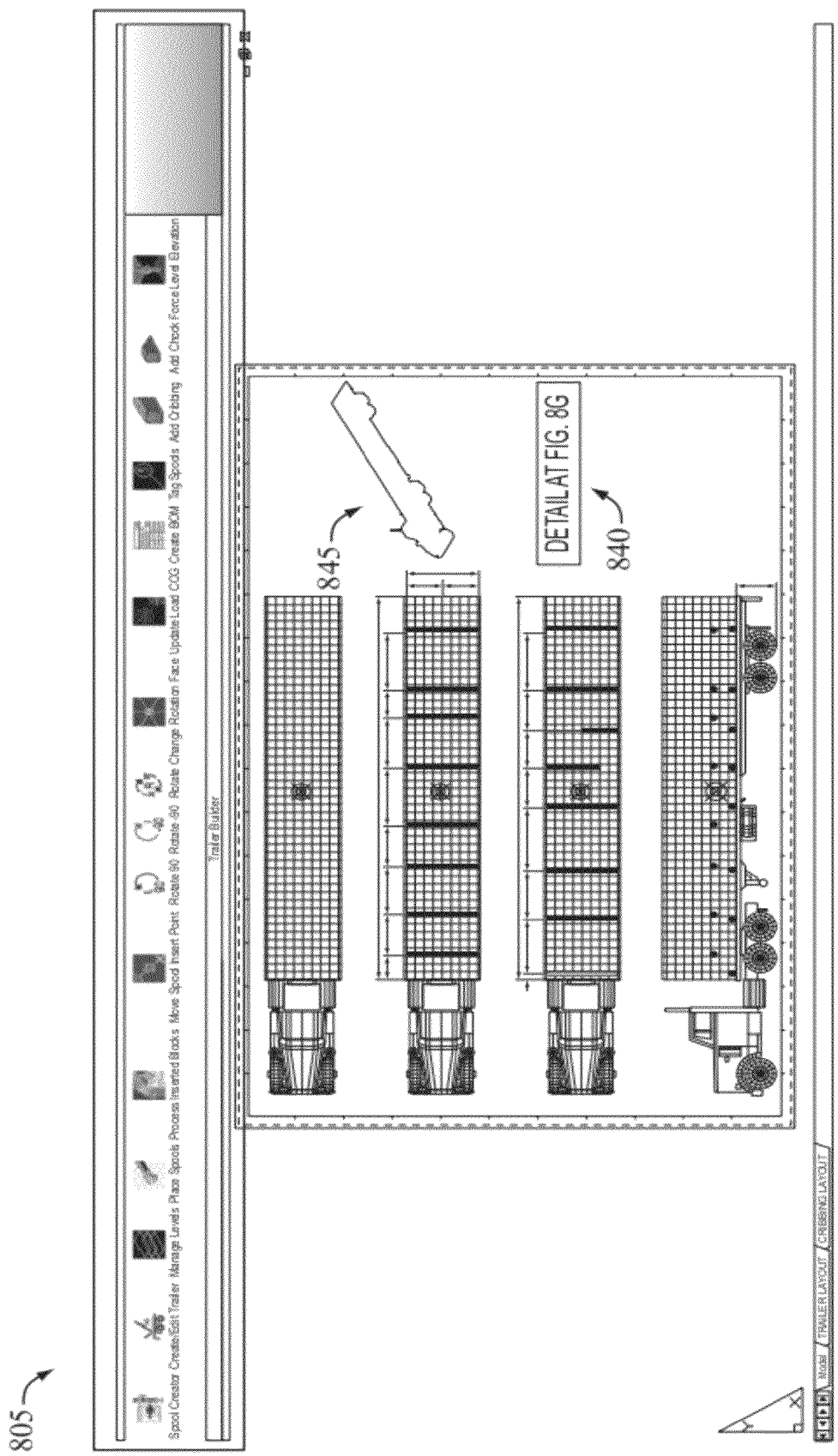
Figure 8G:
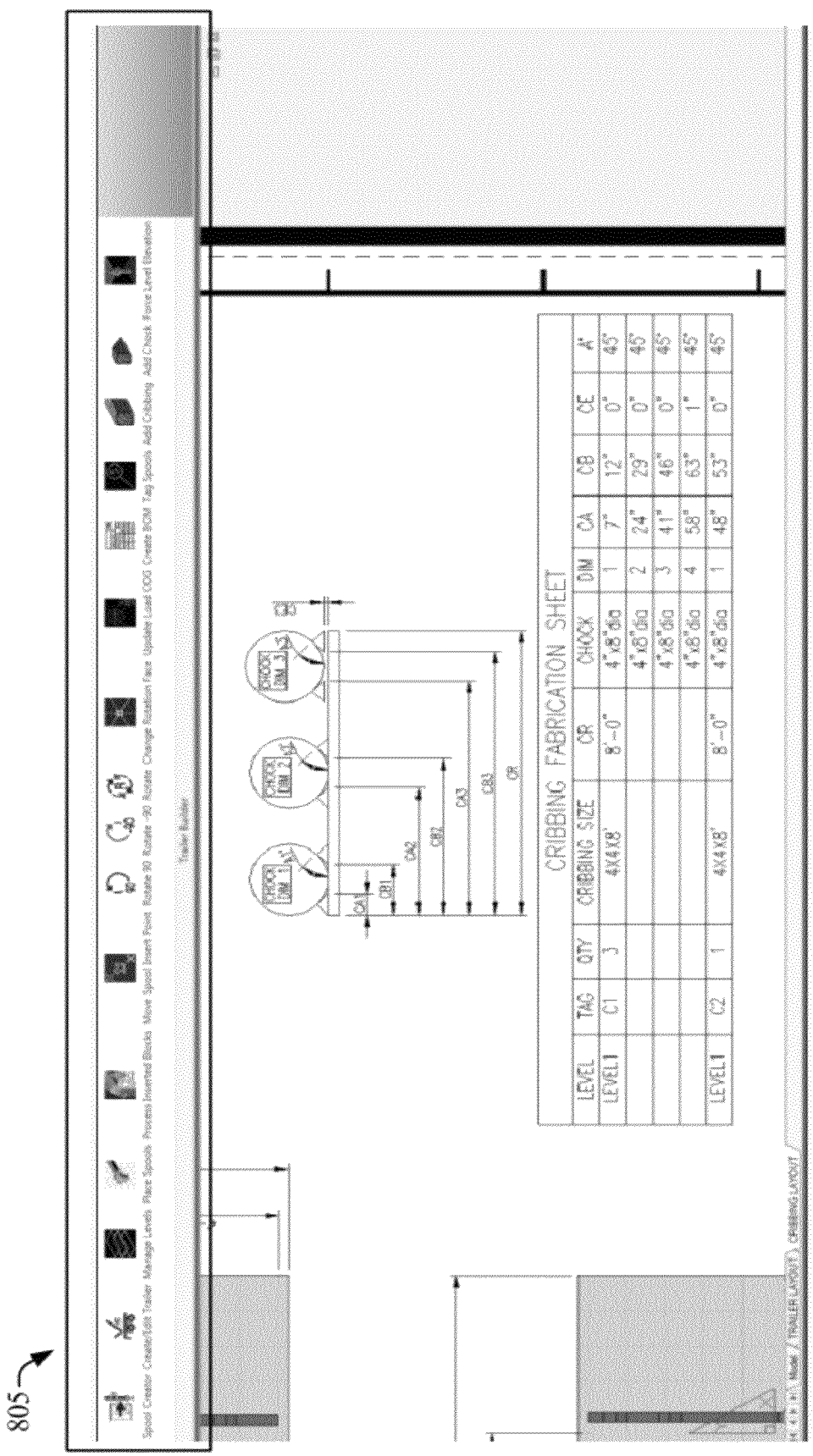
Figure 8H:
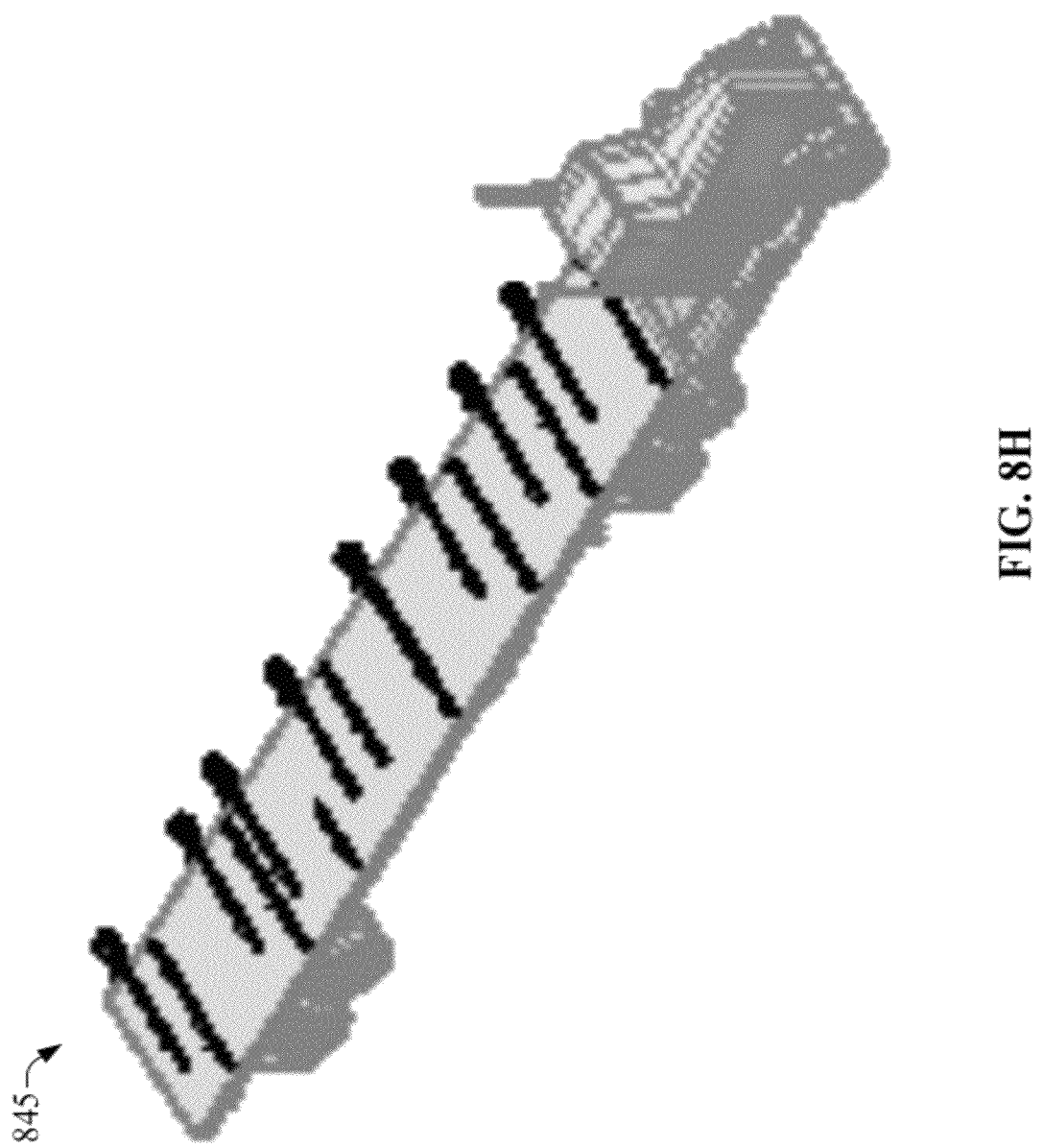

FIGS. 8A-8H present a sequence of exemplary renderings that illustrate various aspects of packing planning in accordance with the subject disclosure. One or more of I/O interface(s) 230 can convey such renderings. Such renderings exemplify various stages of packing a flat-bed trailer in accordance with various aspects herein. Similar, yet not identical, renderings can be produced as part of utilization of packing planning platform 110 to produce loading or unloading of storage-related containers (e.g., storage container). A plurality of thumbnails (represented with block 805) permit navigating and accessing specific functionality of planning platform 110. In FIG. 8A, the flat-bed trailer five fabrication spools are positioned (light grey) and other four fabrication spools (dark grey) remain to be loaded. In FIG. 8B, a group of fabrication spools is loaded in conjunction with cribbing. Illustrates. Panel 810 illustrates details of fabrication spools and cribbing, which is represented with black bars in panel 825. Similarly, in FIG. 8C, panel 835 presents the flat-bed trailer as having two loaded levels, which in certain scenarios are referred as two zones. In panel 830, a BOM is conveyed, or reported. The BOM discloses features of loaded spools and related cribbing. Similarly, yet not identically, to the BOM in FIG. 7D, the BOM in panel 830 also presents a fabrication sequence for various objects in the loaded trailer. FIG. 8D displays a rendering with indicia that discloses specific information related to the flat-bed trailer comprising total height and total weight after loading the fabrication spools and cribbing. Renderings in FIG. 8E and FIG. 8F convey aspects of cribbing (represented with dark elongated indicia) as determined by packing planning platform 110. In FIG. 8F, a report similar to that in FIG. 7 is presented, illustrating an empty track, views of determined cribbing in two levels of the flat-bed trailer, side view, perspective view, and report presenting BOM 845 for illustrated cribbing. FIG. 8G presents such BOM 845, or a related report, in greater detail. FIG. 8H illustrates a detail of diagram 845 in FIG. 8F displaying cribbing (represented with black elongated indicia) loaded in the flat-bed trailer of FIG. 8F.

Figure 9:
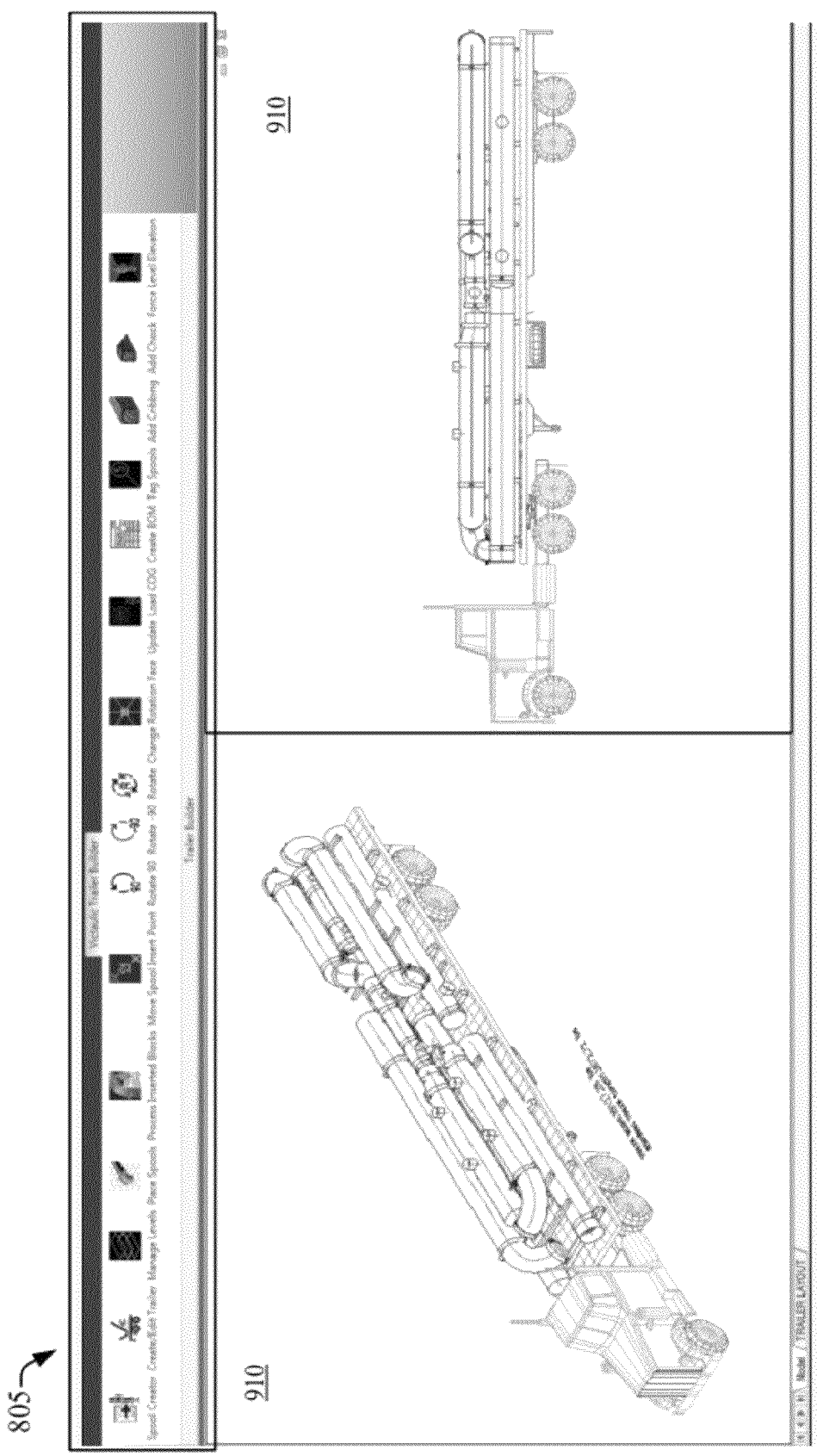
FIG. 9 illustrates a rendering of two views of an illustrative loaded trailer in accordance with aspects of the subject disclosure.

FIG. 9 illustrates a rendering of two views (910 and 920) of an illustrative loaded trailer and an exemplary set of indicia 905 that enable various functionality of packing planning platform 110 described herein.

In various aspects, it is contemplated that the methods and systems described herein can employ Artificial Intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

Various advantages emerge from the description of the various embodiments set forth herein. As an example, one advantage of certain embodiments of the subject disclosure is that development of fabrication plans (e.g., fabrication sequences) of objects to be transported can be based at least on details of shipping or delivery of the irregularly-shaped objects. In certain scenarios, such plans can reduce production of objects (e.g., fabrication spools) that are likely to experience shipping delays that can arising from not fitting into a container acquired (e.g., leased) for transportation. As another example, another advantage of certain embodiments herein is reduction of various planning stages or cycles for transportation logistics; certain embodiments provide a virtual loading environment that can be automated or semi-automated and thus can allow assessment of various loading scenarios within short simulation times (e.g., of the order of seconds or minutes) rather than incurring time and human resource costs. It is readily apparent that at least such advantages can make supply chains substantially more efficient.

It will be apparent that various modifications and variations can be made in the subject disclosure without departing from the scope or spirit of the subject disclosure. Other aspects of the subject disclosure will be apparent to those skilled in the art from consideration of the specification and practice of the subject disclosure set forth herein. It is intended that the specification and examples be considered as exemplary only, with a true scope and spirit of the subject disclosure being indicated by the following claims.

What is claimed is:

1. A method, the method comprising:
   (a) storing a model for each object of a plurality of objects, each model comprising a weight, a center of gravity and a shape of the associated object, wherein the plurality of objects comprises a plurality of irregularly-shaped objects;
   (b) storing a plurality of parameters associated with a container, wherein the container is at least one of a storage space, a staging space, a transportation space, and a manufacturing space;
   (c) selecting a set of irregularly-shaped objects, from the plurality of irregularly-shaped objects, to be loaded into the container;
   (d) generating an optimized sequence for loading the set of irregularly-shaped objects into the container, based on at least the weight, the center of gravity, the shape of each of the irregularly-shaped objects in the set, and the plurality of parameters associated with the container; and
   (e) generating an optimized sequence for loading cribbing into the container between one or more of the set of irregularly shaped objects such that the set of irregularly shaped objects are secured in place.

2. The method of claim 1, wherein the plurality of objects further comprises at least one regularly-shaped object.

3. The method of claim 1, further comprising displaying a map depicting the optimized sequence for loading the set of irregularly-shaped objects into the container.

4. The method of claim 1, further comprising displaying a map depicting the optimized sequence for loading the set of irregularly-shaped objects into the container and the optimized sequence for loading cribbing into the container.

5. The method of claim 1, wherein the plurality of parameters associated with the container include a container length, a container height, and a container width.

6. The method of claim 1, wherein the plurality of parameters associated with the container include at least one of a weight capacity of the container, or a volumetric capacity of the container.

7. The method of claim 1, wherein the set of irregularly-shaped objects comprises a pipe fabrication spool.

8. The method of claim 1, wherein the container is one of a trailer, a sea container, or a rail cart.

9. The method of claim 1, wherein the optimized sequence for loading the set of irregularly-shaped objects into the container is further based on a predetermined unloading sequence.

10. The method of claim 1, wherein generating the optimized sequence for loading cribbing into the container comprises generating the optimized sequence for loading cribbing between two or more of the set of irregularly shaped objects such that the set of irregularly shaped objects are secured in place.

11. The method of claim 1, wherein the generating the optimized sequence for loading the set of irregularly-shaped objects into the container comprises calculating a loaded center of gravity of the set of irregularly-shaped objects.

12. The method of claim 11, wherein the generating the optimized sequence for loading the set of irregularly-shaped objects into the container further comprises positioning the set of irregularly-shaped objects so that the loaded center of gravity of the set of irregularly-shaped objects is less than a desired distance from the trailer center of gravity.

13. A system for generating a plan for loading objects into a container, the system comprising:
   (a) a database for storing:
      (i) a model for each object of a plurality of objects, wherein the plurality of objects includes at least one irregularly-shaped object, each model comprising a weight, a center of gravity and a shape of a respective object; and
      (ii) a plurality of parameters associated with the container; and
   (b) a processor for performing the steps of:
      (i) selecting a set of irregularly-shaped objects from the plurality of objects and a set of regularly-shaped objects to be loaded into the container;
      (ii) generating an optimized sequence for loading into the container the set of irregularly-shaped objects, based on at least the weight, the center of gravity, the shape of each of the irregularly-shaped objects of the set of irregularly-shaped objects and the plurality of parameters associated with the container; and
      (iii) generating an optimized sequence for loading cribbing into the container between one or more of the set of irregularly shaped objects such that the set of irregularly shaped objects are secured in place.

14. The system of claim 13, wherein the plurality of objects further comprises at least one regularly-shaped object.

15. The system of claim 13, wherein the processor further performs the step of: (iv) displaying a map depicting the optimized sequence for loading into the container the set of irregularly-shaped objects and the set of regularly-shaped objects.

16. The system of claim 13, wherein the processor further performs the step of: (v) displaying a map depicting the optimized sequence for loading into the container the set of irregularly-shaped objects and the set of regularly-shaped objects, and the optimized sequence for loading cribbing into the container.

17. The system of claim 13, wherein the plurality of parameters associated with the container include a container length, a container height, and a container width.

18. The system of claim 13, wherein the plurality of parameters associated with the container include a weight capacity of the container.

19. The system of claim 13, wherein the set of irregularly-shaped objects comprises a pipe fabrication spool.

20. The system of claim 13, wherein the container is one of a trailer, a sea container, or a rail cart.

21. The system of claim 13, wherein the optimized sequence for loading into the container the set of irregularly-shaped objects is further based on a predetermined unloading sequence.

22. The system of claim 13, wherein generating the optimized sequence for loading into the container the set of irregularly-shaped objects comprises calculating a loaded center of gravity of the set of irregularly-shaped objects and the set of regularly-shaped objects.

23. The system of claim 22, wherein generating the optimized sequence for loading into the container the set of irregularly-shaped objects further comprises positioning the set of irregularly-shaped objects and the set of regularly-shaped objects so that the loaded center of gravity of the set of irregularly-shaped objects and the set of regularly-shaped objects fulfills a packing efficiency criterion, wherein the packing efficiency criterion can be a tolerance from the trailer center of gravity.

24. A computer-readable storage medium configured for use in generating a plan for loading objects into a container, the computer-readable storage medium encoded with computer-executable instructions comprising:

(a) first computer-executable instructions that, in response to execution, cause a computer to store a model for each of a plurality of objects, each model comprising a weight, a center of gravity and a shape of an associated object of the plurality of objects, wherein the plurality of objects comprises a plurality of irregularly-shaped objects;

(b) second computer-executable instructions that, in response to execution, cause the computer to store a plurality of parameters associated with the container;

(c) third computer-executable instructions that, in response to execution, cause the computer to select a set of irregularly-shaped objects, from the plurality of objects, to be loaded into the container;

(d) fourth computer-executable instructions that, in response to execution, cause the computer to generate an optimized sequence for loading the set of irregularly-shaped objects into the container, based on at least the weight, the center of gravity, the shape of each of the irregularly-shaped objects in the set of irregularly-shaped objects and the plurality of parameters associated with the container; and (e) fifth computer-executable instructions that, in response to execution, cause the computer to generate an optimized sequence for loading cribbing into the container between one or more of the set of irregularly shaped objects such that the set of irregularly shaped objects are secured in place.

* * * * *